US012391533B2

(12) United States Patent
Siegel

(10) Patent No.: US 12,391,533 B2
(45) Date of Patent: Aug. 19, 2025

(54) INTELLIGENT CONCENTRATE MIXING AND DELIVERY

(71) Applicant: Bev-Edge, LLC, Ridgefield, CT (US)

(72) Inventor: Thomas G. Siegel, Longmont, CO (US)

(73) Assignee: Bev-Edge LLC, Ridgefield, CT (US)

( * ) Notice: Subject to any disclaimer, the term of this patent is extended or adjusted under 35 U.S.C. 154(b) by 228 days.

(21) Appl. No.: 18/243,533

(22) Filed: Sep. 7, 2023

(65) Prior Publication Data

US 2023/0416068 A1 Dec. 28, 2023

Related U.S. Application Data

(63) Continuation-in-part of application No. 17/854,442, filed on Jun. 30, 2022, now Pat. No. 12,060,255, which is a continuation of application No. 16/907,553, filed on Jun. 22, 2020, now Pat. No. 11,407,629, which is a continuation of application (Continued)

(51) Int. Cl.

| | |
|---|---|
| ***B65D 1/00*** | (2006.01) |
| ***B67D 1/00*** | (2006.01) |
| ***B67D 1/08*** | (2006.01) |
| ***B67D 7/02*** | (2010.01) |

(52) U.S. Cl.

CPC ......... *B67D 1/0016* (2013.01); *B67D 1/0043* (2013.01); *B67D 1/0878* (2013.01); *B67D 7/02* (2013.01)

(58) Field of Classification Search

CPC .. B65D 1/0016; B65D 1/0043; B65D 1/0878; B65D 1/0888; B65D 1/12; B65D 7/02

See application file for complete search history.

(56) References Cited

U.S. PATENT DOCUMENTS

| | | |
|---|---|---|
| 5,207,784 A | 5/1993 | Schwartzendruber |
| 6,003,318 A | 12/1999 | Busick et al. |
| 6,182,555 B1 | 2/2001 | Scheer et al. |

(Continued)

FOREIGN PATENT DOCUMENTS

| | | |
|---|---|---|
| KR | 20220055812 A | 5/2022 |

OTHER PUBLICATIONS

PCT International Search Report and Written Opinion for PCT/US2023/032200, dated Dec. 21, 2023.

*Primary Examiner* — Jennifer C Chiang

(74) *Attorney, Agent, or Firm* — Ryan T. Grace; Advent, LLP

(57) ABSTRACT

A system for determining a quality of a beverage can include a flow sensor for coupling with an outlet for waste from a beverage dispenser. The system can also include a controller coupled with the flow sensor for receiving an indication of the presence and/or absence of waste. The controller can be coupled with an actuation mechanism and configured to: receive an indication of an actuation of the actuation mechanism, determine a time associated with the actuation, calculate a volume associated with a stream of waste, determine a time associated with the stream of waste, and correlate a dump of a beverage to the actuation when the calculated volume associated with the stream of waste is greater than a volume threshold and when a difference in time between the time associated with the stream of waste and the time associated with the actuation is less than a time threshold.

20 Claims, 11 Drawing Sheets

Related U.S. Application Data

No. 15/954,563, filed on Apr. 16, 2018, now Pat. No. 10,689,239.

(60) Provisional application No. 63/404,257, filed on Sep. 7, 2022, provisional application No. 62/485,611, filed on Apr. 14, 2017.

(56) References Cited

U.S. PATENT DOCUMENTS

| | | | | |
|---|---|---|---|---|
| 6,374,845 | B1 | 4/2002 | Melendez et al. | |
| 6,669,051 | B1 | 12/2003 | Phallen et al. | |
| 8,746,506 | B2 | 6/2014 | Jersey et al. | |
| 8,985,396 | B2 | 3/2015 | Jersey et al. | |
| 9,193,575 | B2 | 11/2015 | Jersey et al. | |
| 11,427,457 | B1 * | 8/2022 | Michelsen ........... | B67D 1/0888 |
| 2010/0116741 | A1 | 5/2010 | Cartwright | |
| 2010/0116742 | A1 | 5/2010 | Cartwright | |
| 2013/0325173 | A1 | 12/2013 | Crisp, III | |
| 2014/0150669 | A1 | 6/2014 | Green et al. | |
| 2015/0158712 | A1 | 6/2015 | Jersey et al. | |
| 2016/0100709 | A1 | 4/2016 | Rudick et al. | |
| 2017/0254055 | A1 | 9/2017 | Xia | |
| 2018/0018601 | A1 | 1/2018 | Wansink | |
| 2018/0042258 | A1 | 2/2018 | Roberts et al. | |
| 2018/0044158 | A1 | 2/2018 | Jersey et al. | |
| 2018/0072555 | A1 | 3/2018 | Fortunato et al. | |
| 2018/0235253 | A1 | 8/2018 | Tuchrelo et al. | |
| 2018/0257919 | A1 | 9/2018 | Balstad et al. | |
| 2018/0341891 | A1 | 11/2018 | Setchell et al. | |
| 2018/0368441 | A1 | 12/2018 | Tuchrelo et al. | |
| 2019/0330043 | A1 | 10/2019 | Carpenter et al. | |
| 2020/0384415 | A1 | 12/2020 | Kamkar et al. | |
| 2022/0063981 | A1 | 3/2022 | Andrews et al. | |

* cited by examiner

INTELLIGENT CONCENTRATE MIXING AND DELIVERY

CROSS-REFERENCE TO RELATED APPLICATIONS

The present application claims the benefit under 35 U.S.C. § 119(e) of U.S. Provisional Application Ser. No. 63/404,257, filed Sep. 7, 2022, and titled "INTELLIGENT CONCENTRATE MIXING AND DELIVERY." The present application is also a continuation-in-part under 35 U.S.C. § 120 of U.S. patent application Ser. No. 17/854,442, filed Jun. 30, 2022, and titled "METHODS AND SYSTEMS FOR AN INTELLIGENT CONCENTRATE MIXING AND DELIVERY DEVICE," which is a continuation under 35 U.S.C. § 120 of U.S. patent application Ser. No. 16/907,553, filed Jun. 22, 2020, and titled "METHODS AND SYSTEMS FOR AN INTELLIGENT CONCENTRATE MIXING AND DELIVERY DEVICE," which is a continuation under 35 U.S.C. § 120 of U.S. patent application Ser. No. 15/954,563, filed Apr. 16, 2018, and titled "METHODS AND SYSTEMS FOR AN INTELLIGENT CONCENTRATE MIXING AND DELIVERY DEVICE," which itself claims priority under 35 U.S.C. § 119(e) of U.S. Provisional Application Ser. No. 62/485,611, filed Apr. 14, 2017. U.S. patent application Ser. Nos. 17/854,442; 16/907,553; and Ser. No. 15/954,563; and U.S. Provisional Application Ser. Nos. 63/404,257 and 62/485,611 are herein incorporated by reference in their entireties.

BACKGROUND

A beverage manufactured by a beverage company typically includes a series of ingredients with a large proportion of water (still or carbonated) to create the final beverage. The packaged version of the product can be filled in a plastic bottle, aluminum can, pouch, glass bottle, etc., and can be sold on the market directly to a consumer for direct consumption of the beverage. Alternatively, beverage companies can improve the economics and sustainability of supplied beverages by shipping the ingredients separately and adding water at the point of dispense. This solution is leveraged by restaurants, convenience stores, and similar food service establishments through post-mix dispense systems.

DRAWINGS

The Detailed Description is described with reference to the accompanying figures. The use of the same reference numbers in different instances in the description and the figures may indicate similar or identical items.

DETAILED DESCRIPTION

Figure 1:
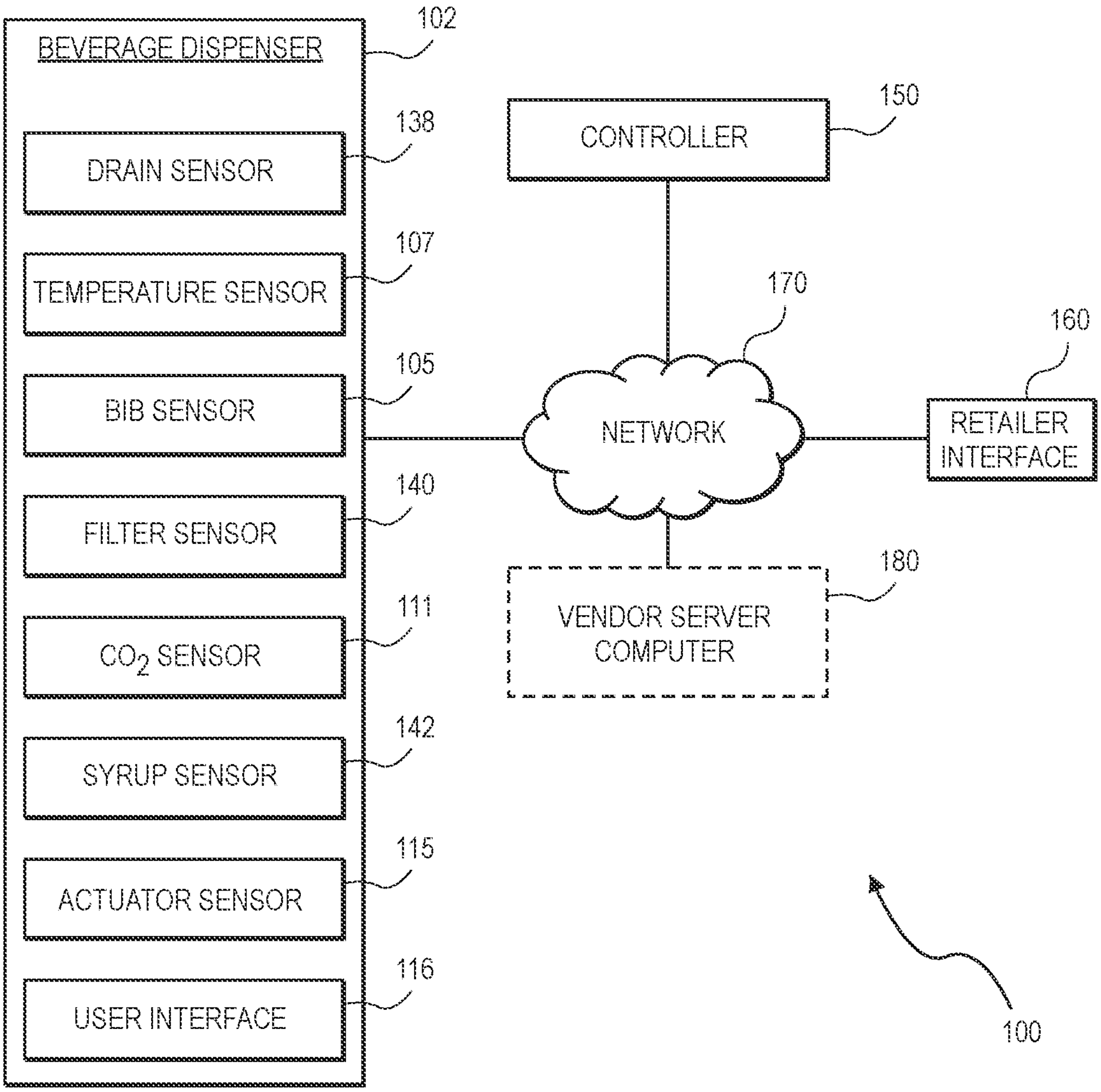
FIG. 1 is a diagrammatic illustration of a system including a communications network and a beverage dispenser, where the system is configured to determine a quality of a dispensed beverage in accordance with example embodiments of the present disclosure.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be embodied as formulations, beverage products, processes, processes for making beverage products, and processes for making formulations. The following detailed description is, therefore, not to be taken in a limiting sense.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

Before describing in detail embodiments that are in accordance with the systems and methods disclosed herein, it should be observed that embodiments include combinations of method steps and/or system components. Accordingly, the system components and method steps have been represented where appropriate by conventional symbols in the drawings, showing only those specific details that are pertinent to understanding the embodiments of the systems and methods disclosed herein so as not to obscure the disclosure with details that will be readily apparent to those of ordinary skill in the art having the benefit of the description herein.

In the following description, it is understood that terms such as "first," "second," "top," "bottom," "up," "down," and the like, are words of convenience and are not to be construed as limiting terms.

Foodservice customers (commercial restaurants, cafeterias, convenience stores, etc.) are also an important sales channel for beverage companies. Originally, finished beverages (e.g. soda) were filled in large vessels (e.g., five-gallon containers) and transported to an end customer (e.g., a restaurant). However, this was a very inefficient process.

Several decades ago, a much more efficient approach was launched, called post-mix (i.e., mixing the finished beverage post leaving the factory). Water is generally the highest volume ingredient in a beverage. Since water is typically readily available at the tap in a commercial environment, it can be more desirable from a packaging, sustainability, and distribution cost perspective to postpone the addition of water until the point of dispense in a commercial beverage dispense application.

The concentrate (typically a mixture of flavors, colors, acidulant, sweetener, and perhaps a small amount of water) is packed into a bag-in-box (BIB), for example, in quantities of five gallons or smaller. Post-mix dispensing equipment can be utilized, and the concentrate can be mixed with a restaurant-supplied water source to create the finished beverages. This capability has significantly reduced transportation and packaging costs. Typically dispensed soda is created with one-part syrup (as soda concentrate is termed) to about five parts water, so implementing a post-mix dispenser (also commonly known as a "fountain") reduced the shipping quantity by about ⅚, resulting in significant savings. Other beverages beyond soda also use this "post-mix" approach, including juices, coffee, milk, tea, etc. For instance, orange juice used for food service applications normally uses concentrated juice shipped in cartridges that fit inside a juice dispenser. Water can be similarly added within the dispenser when the consumer engages the machine to achieve the finished beverage. As used herein, the term "syrup" can refer to one or more beverage components in the form of a liquid mixture of ingredients for making, mixing, and/or compounding sugary drinks, such as soft drinks. However, it shall be understood that when the term syrup is used herein, the embodiments described shall also encompass the use of other liquid mixtures, including, but not necessarily limited to: juice, tea, coffee, and/or other liquid concentrates for making, mixing, and/or compounding drinks using one or more other ingredients.

Beverage companies have been continually looking for ways to further reduce distribution costs. One such cost-saving mechanism is custom dispensing (e.g., Coke Freestyle, Pepsi Spire, etc.), which facilitates the customizable combining of beverage ingredients. For example, custom dispensing units may use "deconstructed" ingredients of their base constituents: flavor concentrate, acidulant, and sweetener (water is the fourth ingredient).

Dispensed beverages offer retailers high-profit margins (often 90%+), but generally need to be self-sufficient so that retail staff can focus on selling tacos, cooking food, etc. This is particularly important with self-serve machines as the retailer generally has little engagement with these machines. Further, as retailers optimize staffing, the availability of staff to verify dispenser performance is minimal, so the machines must be reliable.

There are four major attributes of a dispensed beverage: temperature, syrup/water ratio, carbonation (for carbonated drinks), and water quality. Should there be any problem with any one of these attributes at the time of dispense, the customer will reject the beverage and will often times request a new one. The result of the rejected beverage due to one or more failed attributes comes at a loss of otherwise acceptable standalone product, and if the customer requests a replacement, then the loss of the product comes at a loss of potential profits. Therefore, it is desirable for a business to reduce wasted products as much as possible by ensuring that each of the four attributes is adequately provided at the time of dispense.

In general, beverage dispensers are "dumb" and do not communicate problems to the retail staff. If there is a problem with the dispensed product, there is no easy way for the staff to know. The current paradigm for the staff to discover a problem is for a consumer who is unhappy with their drink to inform the staff there is a problem; however, consumers rarely do this. When the consumer experiences a bad drink, they typically dump it out and usually try another brand. In other words, the consumer acts as a "quality sensor," but rarely informs retail staff when there is a problem with a beverage dispenser. Further, the retail staff often know little about the workings of the beverage dispenser and typically have little understanding of how to fix a malfunctioning beverage dispenser.

Another problem relates to the consumer creating new custom beverage combinations (e.g., mixing of flavors outside of usual and customary ones), which often end up disappointing the consumer. In this scenario, a consumer creates a beverage by mixing one or more base brands together (possibly with one or more flavor shots) and simply does not like the outcome, resulting in the consumer dumping the beverage down the drain and starting the process again. For example, a combination of a lemon and lime-flavored soft drink with an orange flavor shot may result in a flavor that often causes the consume to discard the beverage. This problem is referred to as the "sip-and-dump" problem, which also constitutes a waste of otherwise acceptable ingredients.

Other problems may relate to a failed attribute of syrup-to-water ratio, water quality, temperature, or carbonation.

Symptoms of incorrect syrup-to-water ratio include a weak flavored drink or the drink being too sweet. This problem may be due to a near-empty BIB or the water supply is impeded. To fix this problem, most commonly the BIB should be replaced or possibly a water booster and/or water pressure regulator should be installed on the water supply line.

Symptoms of poor water quality include a chemical taste (e.g., chlorine, ammonia, etc.) in the beverage. This problem may be due to an old water filter or a bypassed filter. To fix this problem, either the water filter should be replaced, a chloramine filter may be added to the water supply line, or the water filter can be taken off bypass.

Symptoms of incorrect temperature include a warm beverage and/or the beverage has poor carbonation. This problem may be due to a failed or turned-off recirculation system or inadequate ice on the cold plate. To fix this problem, the functionality of the recirculation system should be checked, the functionality of the ice machine should be checked, or the cold plate should be checked to ensure that ice is in contact with the cold plate.

Symptoms of poor carbonation include a flat drink. This problem may be due to incorrect temperature or the quantity of $CO_2$ in the $CO_2$ source is low. To fix this problem, the temperature of the recirculation line or the cold plate should be checked, or the $CO_2$ source should be replaced.

Systems, techniques, and apparatus as described herein provide beverage dispense systems that are configured to determine a quality of a dispensed beverage, receive user feedback regarding the quality of the dispensed beverage, monitor components of a beverage dispenser, and/or notify retail staff and/or beverage dispenser vendors of any problems associated with the dispensed beverages based on received user feedback and/or the monitored components. Through early detection of problems regarding the quality of a beverage, consumer satisfaction is improved and the waste of ingredients may be reduced or prevented, thereby reducing unnecessary supply costs for a retailer.

In embodiments, a beverage dispense system 100 includes a controller 150 communicatively coupled to multiple sensors that are respectively coupled to components of a beverage dispenser 102 for monitoring characteristics of respective components. For example, respective sensors may be coupled to a waste outlet 104 of the beverage dispenser 102 to determine that a beverage is discarded, coupled to a cold plate 106 of the beverage dispenser 102 to determine an associated temperature of the cold plate 106, coupled to a BIB 108 of the beverage dispenser 102 to determine a remaining quantity of an associated beverage syrup in the BIB 108, coupled to a carbon dioxide ($CO_2$) reservoir (e.g., $CO_2$ source 110) of the beverage dispenser to determine a remaining quantity of $CO_2$ in the reservoir, coupled to a water supply line 112 of the beverage dispenser 102 to determine water flow rates supplied to the beverage dispenser 102, coupled to a beverage dispensing actuator (e.g., an actuation mechanism 114) for determining a beverage selected by a user, and so forth.

In embodiments, the beverage dispense system 100 includes one or more interfaces communicatively coupled to the controller 150 for displaying messages to and receiving feedback from a user and/or retail staff.

In general, system 100 operates under the following scenarios:

Scenario 1: system 100 detects a dispense of a first beverage associated with a particular brand. Within an amount of time (e.g., 10 seconds) a slightly smaller amount of liquid than the original dispensed beverage pouring down a drain is detected. In this scenario, it is likely a sip-and-dump situation. Certain assumptions can be formulated as to the root cause of the dump, which can be improved with time and several other dispensed beverages other than the first beverage are dispensed. In this example, system 100 detects that a beverage is dispensed, that the beverage is the same as the first beverage, and that liquid pouring down the drain is detected. In this scenario, system 100 correlates the dumping of the beverages with the particular brand and therefore determines that there is likely a problem with the BIB associated with the particular brand.

Scenario 2: system 100 determines that beverage dumps occur only with carbonated beverages whereas non-carbonated drinks (e.g., tea, lemonade, electrolyte drinks, etc.) are not discarded. Therefore, system 100 determines that there is likely a problem with the $CO_2$ supply.

Scenario 3: system 100 determines that a user activates a whole series of different brands in succession and then subsequently detects a discarded beverage pouring down the drain. This type of drink results from the user combining an experimental and/or random broad mix of brands. Therefore, system 100 determines that the discarded beverage is not the result of poor quality stemming from a problem with one of the four beverage attributes, and a sip-and-dump is not identified.

Scenario 4: system 100 detects fluids pouring down the drain after a significant amount of time (e.g., 1 minute) after the most recent beverage was dispensed. In this scenario, the user is most likely cleaning up after a meal and is discarding the last remnants of their beverage down the drain. Therefore, system 100 takes no action.

Scenario 5: system 100 detects multiple sip-and-dumps for more than one beverage brand of either carbonated or non-carbonated brands. If the brands are exclusively carbonated, then system 100 determines that there could be a temperature problem with the cold plate or recirculation system. If the discarded beverages contain both carbonated and non-carbonated brands, then system 100 determines that there may be a problem with water quality.

Scenario 6: system 100 detects that a sip-and-dump occurs after a long period of inactivity (e.g., a first dispensed beverage of the day). In this scenario, it is typical for the water (and syrup) to warm up in the tubing and other components (e.g., carbonator) after not having been dispensed for a prolonged period. This problem is often referred to as a "casual draw" problem, and the problem is typically resolved after a subsequent series of dispensed beverages. Therefore, in response to detecting the sip-and-dump, system 100 may ask the user to provide feedback regarding the discarded beverage and/or wait to see the results of subsequent pours as the temperature of the ingredients decreases with increased usage.

Figure 2:
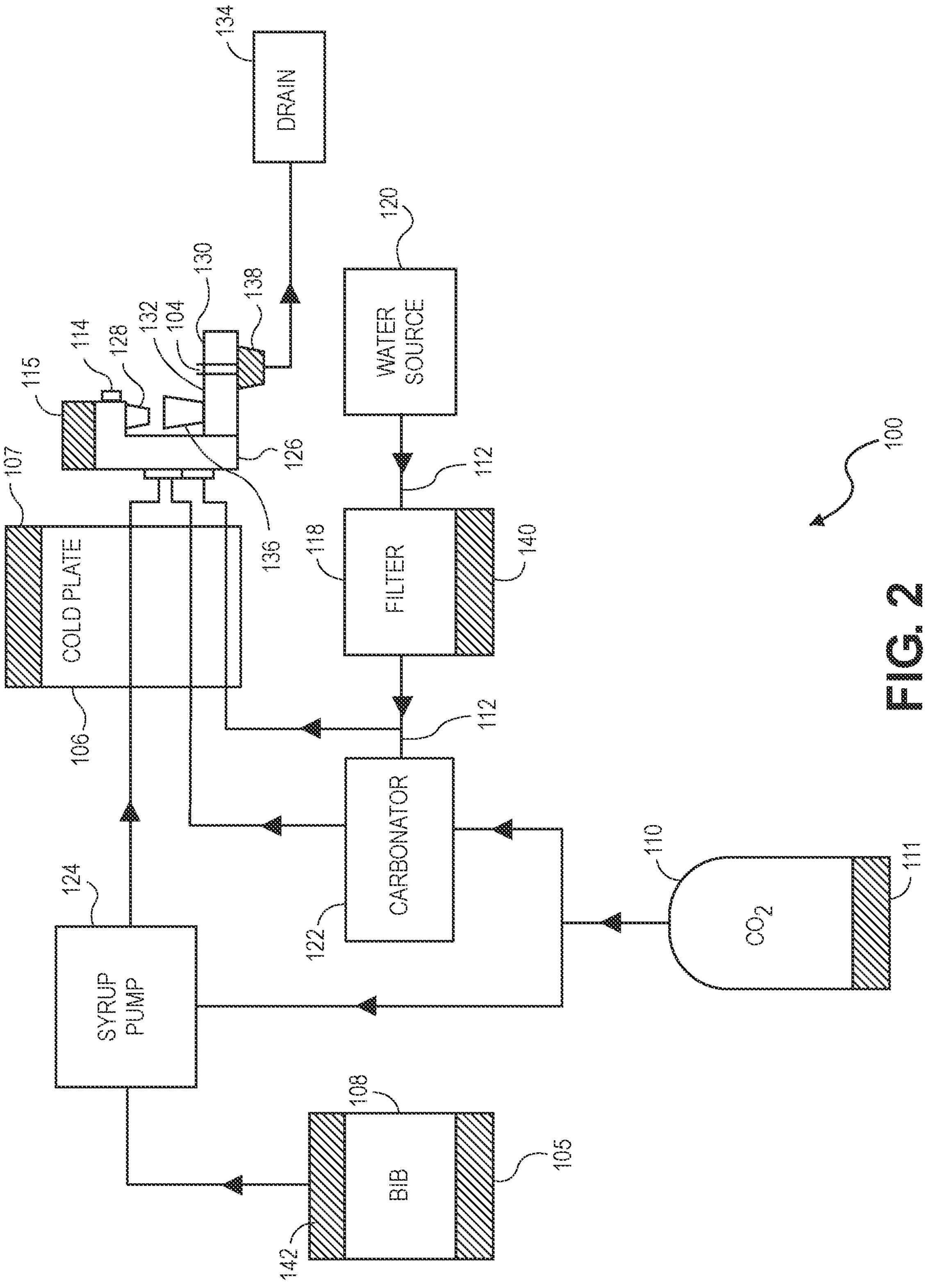
FIG. 2 is a diagrammatic illustration of the system illustrated in FIG. 1, further illustrating a fluid network in accordance with example embodiments of the present disclosure.

Referring generally to FIGS. 1 and 2, a system 100 includes the beverage dispenser 102, the controller 150, and a retailer interface 160. The beverage dispenser 102 also includes a user interface 116, beverage dispense components, and sensors respectively coupled to the components. As depicted in FIG. 1, the sensors of beverage dispenser 102, the user interface 116 of beverage dispenser 102, the controller 150, and the retailer interface 160 are communicatively coupled via network 170. Optionally, a vendor server computer 180 may also be communicatively coupled to the network 170 to permit sending and/or receiving of communications with the controller 150.

User interface 116 and retailer interface 160 are each an interface capable of displaying messages and receiving user input. For example, user interface 116 and retailer interface 160 can each be a touch screen or a combination of a display screen for displaying messages and an input device (e.g., keyboard and/or mouse) for receiving user input.

In general, controller 150 is configured to receive communications (i.e., signals) from the sensors, the user interface 116, and the retailer interface 160. Furthermore, controller 150 is configured to send communications for display on the user interface 116 and the retailer interface 160.

In general, a beverage dispenser 102 (also commonly known as a post-mix beverage dispenser) is a system composed of coupled components in fluid communication configured to mix and deliver a beverage for a user, wherein the components include, but are not limited to, a water filter 118 for filtering water from a water source 120, a $CO_2$ source 110, a carbonator 122 for carbonating water by dissolving $CO_2$ supplied by the $CO_2$ source 110 into water supplied by the water source 120, a BIB 108 containing a syrup product, a syrup pump 124 typically driven by $CO_2$ supplied by the $CO_2$ source for pumping syrup from the BIB 108, and a front-end dispenser 126 where the syrup and carbonated water are mixed together and delivered from a nozzle 128.

In some embodiments, beverage dispenser 102 may include a cold plate 106 that serves as a heat sink for chilling transported water and syrup. The cold plate 106 includes a metal plate (typically aluminum) with embedded tubes for the water lines and the syrup lines to pass through. To cool the water lines and syrup lines, ice is placed in contact with the cold plate 106, thus allowing heat transfer from the water lines and the syrup lines, through the cold plate 106, and to the ice. In other embodiments, beverage dispenser 102 may include a recirculation system that uses a vapor compression system to supply an ice bank in a water bath. The water lines and syrup lines are passed through the water bath where heat is transferred from the water lines and the syrup lines, through the water bath, and to the ice bank. In some embodiments, ice is only used to cool the cold plate 106 without being an ingredient in a beverage.

In some embodiments, beverage dispenser 102 may not include water filter 118 should water source 120 provide water that is adequate for consumption without filtering.

In some embodiments, beverage dispenser 102 may include a double-vented check valve that is fluidly coupled to water line 112. The double-vented check valve is located upstream from carbonator 122 in order to prevent carbonated water from backing into the plumbing system which would otherwise produce carbonic acid should the water line 112 be copper tubing.

The front-end dispenser 126 further includes a cup tray 130 for supporting a beverage receiving cup over a tray drain 132, where the tray drain 132 is configured as a funnel to consolidate and direct fluids (e.g., melted ice from an ice machine, beverage overflow from the cup, discarded beverages, etc.) towards an outlet that is in fluid communication with a drain 134.

To operate the beverage dispenser 102, a user positions a cup 136 beneath the nozzle 128 and presses an actuation mechanism 114 corresponding to a beverage chosen by the user, wherein the actuation mechanism 114 is configured to dispense the corresponding beverage from the nozzle 128.

Systems 100 include multiple sensors respectively coupled to components of the beverage dispenser 102, where each sensor measures a respective characteristic of a corresponding component of the beverage dispenser 102. As used herein, it should be understood and appreciated by those skilled in the art that sensors "measure" a characteristic through a physical interaction with a respective component of system 100 and transmit an electrical signal that correlates to the characteristic. The electrical signal, in turn, is then interpreted and determined by a logic controller or processor (e.g., controller 150). In reference to FIGS. 1 and 2, the sensors may include, but are not limited to, a drain sensor 138 coupled to the waste outlet 104, a temperature sensor 107 coupled to the cold plate 106, a syrup sensor 142 coupled to the BIB 108, a $CO_2$ sensor 111 coupled to the $CO_2$ source 110, a filter sensor 140 coupled to the water filter 118 and/or a water line, a carbonation sensor, and an actuator sensor 115 coupled to the actuation mechanism 114.

In some embodiments, system 100 is an aftermarket system. In other words, the sensors and controller of system 100 are coupled to components of a beverage dispenser 102 that was previously installed at the retailer.

Characteristics of each component measured by each respective sensor may include, but are not limited to, pressure, fluid presence and/or absence, fluid flow rate, temperature, weight, fluid level (i.e., fluid height corresponding to an amount of fluid volume within a container), and device actuation.

Figure 4:
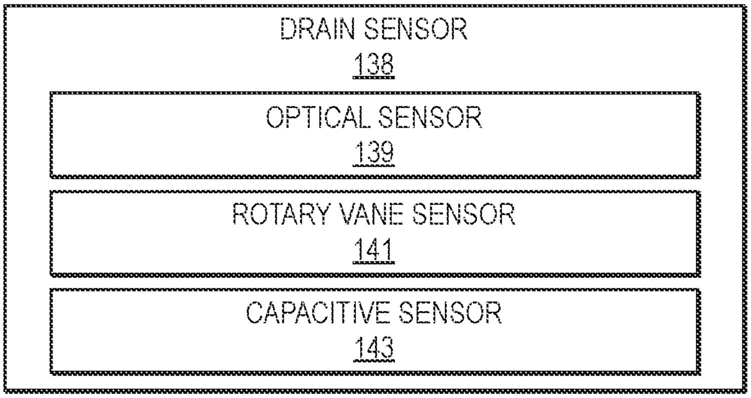
FIG. 4 is a block diagram illustrating one or more components of a drain sensor for a beverage dispenser, such as the beverage dispenser of FIG. 1, in accordance with example embodiments of the present disclosure.

In embodiments, the drain sensor 138 measures fluids passing through the waste outlet 104. In reference to FIG. 4, the drain sensor 138 can be an optical sensor 139 or capacitive sensor 143 that detects the presence and/or absence of a fluid passing through the waste outlet 104, and, when paired with a measured time interval associated with the detection, the combination of measurements can be used to determine an amount of fluid volume passing through the waste outlet 104. In another example, the drain sensor 138 can be a rotary vane sensor 141 in which passing fluids through the waste outlet 104 cause a rotary vane of the rotary vane sensor 141 to rotate such that a fluid volume may be determined based on a measured number of rotations of the rotary vane.

In embodiments, the temperature sensor 107 measures a temperature of the cold plate 106. Alternatively, it should be appreciated by those in the art of post-mix beverage dispensers that some beverage dispensers use a recirculation system that cycles both carbonated and uncarbonated water in recirculation lines instead of a cold plate for chilling carbonated water. In some instances, a recirculation system may be used in conjunction with a cold plate. Therefore, in some embodiments, the temperature sensor 107 may be coupled to a recirculation line containing the carbonated water so as to measure a temperature of the recirculation line. In further embodiments, corresponding temperature sensors are coupled respectively to the recirculation line and the cold plate, thereby allowing individual temperature measurements for the recirculation line and the cold plate respectively.

Figure 8:
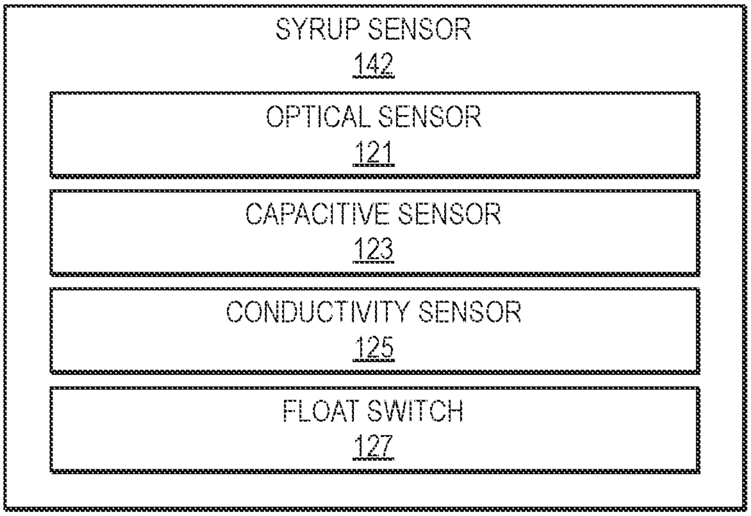
FIG. 8 is a block diagram illustrating one or more components of a syrup sensor for a beverage dispenser, such as the beverage dispenser of FIG. 1, in accordance with example embodiments of the present disclosure.

In embodiments, the syrup sensor 142 measures an amount of syrup remaining in a BIB 108. In reference to FIG. 8, syrup sensor 142 may include one or more of, but is not limited to, an optical sensor 121, a capacitive sensor 123, a conductivity sensor 125, and a float switch 127. For example, in some embodiments, the syrup sensor 142 is a point level sensor that uses known techniques and methods practiced in point level measurements (e.g., measurements through capacitance sensor 123, optical sensor 121, conductivity sensor 125, float switch 127, etc.) which trigger a signal in response to a height of a remaining volume of syrup in the BIB surpassing a threshold height.

Figure 5:
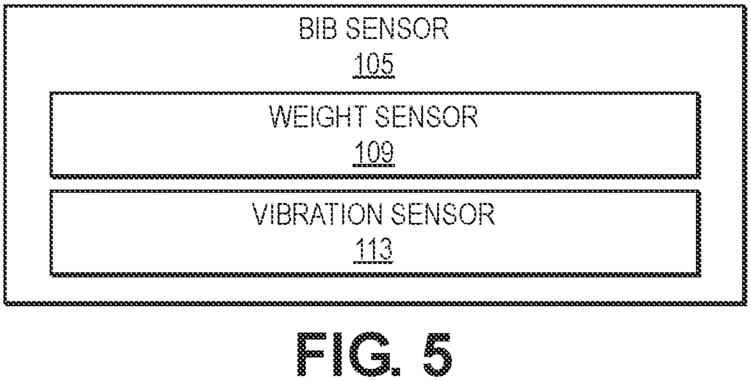
FIG. 5 is a block diagram illustrating one or more components of a bag-in-box (BIB) sensor for a beverage dispenser, such as the beverage dispenser of FIG. 1, in accordance with example embodiments of the present disclosure.
Figure 6:
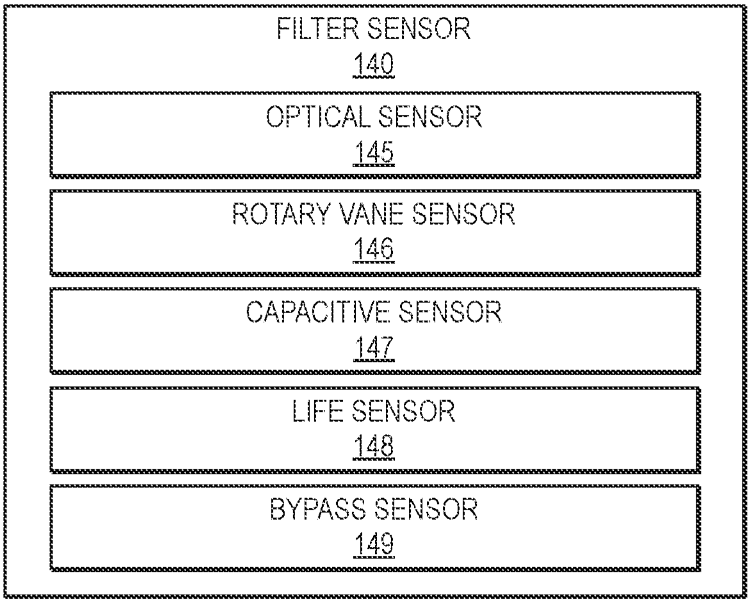
FIG. 6 is a block diagram illustrating one or more components of a filter sensor for a beverage dispenser, such as the beverage dispenser of FIG. 1, in accordance with example embodiments of the present disclosure.

In other embodiments, a BIB sensor 105 measures an amount of syrup remaining in a BIB 108. In reference to FIG. 5, the BIB sensor 105 can be, but is not limited to, a weight sensor 109 and/or a vibration sensor 113 which produce signals that may be correlated to a volume of syrup remaining in the BIB 108. For example, the weight sensor 109, such as a strain gauge sensor or any other senor capable of producing signals that correlate to weight, is positioned beneath the BIB 108, wherein the weight sensor 109 measures the weight of the BIB 108, wherein the measured weight of the BIB 108 is correlated to a volume of syrup remaining in the BIB 108. In another example, the vibration sensor 113 is coupled to the BIB 108 and is capable of producing signals that correlate to measured vibrations of the BIB 108, wherein the measured vibrations, in turn, may be correlated to a volume of syrup remaining in the BIB 108. In this example, as the volume of syrup remaining in the BIB 108 decreases, a resonant behavior (e.g., vibration amplitudes, resonant frequencies, vibration die-off due to material damping, etc.) of the BIB 108 changes. The vibration sensor 113 then measures this resonant behavior which may then be correlated to the weight or volume of syrup remaining in the BIB 108. In another example, a number of vibrational events resulting from a syrup pump 124 drawing syrup from the BIB 108 are counted by the vibration sensor 113, such that an indication of low syrup volume in the BIB 108 (i.e., an indication to replace the BIB 108) occurs when the number of vibrational events exceeds a predetermined value. In other words, frequent use of the BIB 108 and correlated frequent vibration events are indicative that the BIB 108 has a low remaining volume of syrup and needs replacement or refilling. In an embodiment, the vibration sensor 113 is used to measure vibrations indicative of a BIB replacement. In this embodiment, vibrations indicative of a BIB replacement are timestamped, such that the timestamp is used to determine how long ago the BIB was replacement and to approximate a date for a new replacement based on projected consumption rates.

In instances where beverage dispenser 102 provides a variety of beverage products and therefore uses a variety of BIBs, syrup sensors 142 may be respectively associated with the BIBs, therefore providing syrup measurements for each BIB. As described herein, the syrup sensor 142 and/or the BIB sensor 105 can each function as a syrup sensor to facilitate detection of a syrup-to-water ratio associated with a beverage. For example, the controller 150 can be communicatively coupled with a syrup sensor (e.g., one or more of the syrup sensor 142, the BIB sensor 105) and operatively configured to associate a dump of a beverage with a detected syrup-to-water ratio of the beverage. The controller 150 can also be configured to communicate the dump of the beverage. In some embodiments, the controller 150 can correlate the dump of the beverage to, for example, an actuation of an actuation mechanism.

Figure 7:
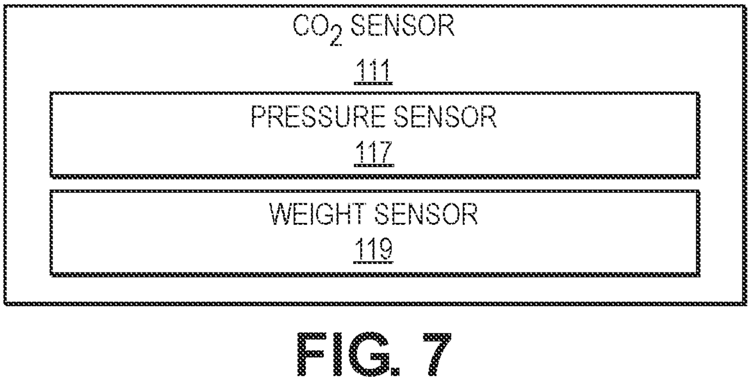
FIG. 7 is a block diagram illustrating one or more components of a $CO_2$ sensor for a beverage dispenser, such as the beverage dispenser of FIG. 1, in accordance with example embodiments of the present disclosure.

In embodiments, the $CO_2$ sensor 111 measures a quantity of $CO_2$ remaining in the $CO_2$ source 110. As used herein, a "quantity" of compressed gas (such as $CO_2$) generally refers to any measurable characteristic (e.g., pressure, weight, etc.) of a compressed gas stored in a volume. It should be understood and appreciated that such quantities can be used to determine (through calculations via ideal gas law) an amount of standard cubic feet meters (scf) or standard cubic meter ($Sm^3$) of a gas contained in a volume. In reference to FIG. 7, the $CO_2$ sensor 111 may include one or more of, but is not limited to, a pressure sensor 117 for measuring pressure of the $CO_2$ source 110 (which is correlated to a quantity of $CO_2$ remaining in the $CO_2$ source 110), and a weight sensor 119 is positioned beneath the $CO_2$ source 110 in which a measurable weight of the $CO_2$ source 110 is correlated to a quantity of $CO_2$ remaining in the $CO_2$ source 110.

In embodiments, the filter sensor 140 measures a volumetric flow of water passing through the water filter 118. In reference to FIG. 5, filter sensor 140 may include one or more sensors such as, but not limited to, an optical sensor 145, a rotary vane sensor 146, a capacitive sensor 147, a life sensor 148 that measures time since previous filter replacement or an amount of total water volume that has passed through the filter, and a bypass sensor 149 that measures whether a filter bypass is activated such that water of the water supply line 112 is diverted and bypasses the water filter 118. In some alternative embodiments, an optical sensor 145, rotary vane sensor 146, and capacitive sensor 147 are positioned on the water line 112 located relatively upstream and/or downstream from the water filter 118 for measuring water flow through the water line 112. In some embodiments, one or more of either an optical sensor 145, rotary vane sensor 146, or capacitive sensor 147 are positioned downstream from the carbonator 122 for measuring carbonated water flow.

In embodiments, the actuator sensor 115 measures (i.e., detects) when the actuation mechanism 114 is engaged. In other words, when a user engages the actuation mechanism 114 which causes beverage dispenser 102 to dispense a beverage, the actuator sensor 115 detects that the actuation mechanism 114 is engaged by the user. In some embodiments, the actuator sensor 115 is a switch sensor mechanically coupled to the actuation mechanism 114.

In other embodiments, the actuator sensor 115 is a touchscreen interface (e.g., user interface 116) displaying user-selectable beverage dispensing options. For example, multiple graphical indicators (e.g., indicia, icons, etc.) can be positioned adjacent to one another on the touch screen, where each of the indicia may represent a different beverage or beverage component. For instance, a first selectable icon may be selected to dispense a cola beverage, a second selectable icon may be selected to dispense a lemon-lime beverage, a third selectable icon may be selected to dispense an orange beverage, and so forth. By receiving a selection from a user on the touchscreen interface, the touchscreen interface effectively serves as an actuator sensor 115 as well as providing a signal to the controller 150 to engage the actuation mechanism 114.

System 100 further includes controller 150 that is communicatively coupled to the sensors. The controller 150 receives signals corresponding to the sensors, wherein each signal correlates to a measurement taken by a respective sensor. In embodiments, the controller 150 compares each measurement to one or more predetermined threshold values to determine whether the measurement taken by the respective sensor is within or surpasses the one or more predetermined threshold values. For example, an acceptable range of temperatures for cold plate 106 is between threshold values of 35 and 40 degrees Fahrenheit such that temperatures outside the range of 35 and 40 degrees surpass the threshold values. In the event that cold plate 106 has a temperature of 41 degrees Fahrenheit, the temperature sensor 107 measures the temperature of cold plate 106 and transmits a signal corresponding to the temperature to controller 150. Controller 150 then receives the signal, compares the measurement to the threshold values of 35 and 40 degrees, and determines that the measurement is greater than 40 degrees, therefore determining that the cold plate 106 is too warm.

In embodiments, responsive to determining that the measurement of one or more ingredient or equipment (e.g., syrup, $CO_2$ source, water filter) exceeds a threshold value, the controller 150 transmits a notification to the retailer interface 160 for notifying retail staff that a component of the beverage dispenser 102 has exceeded a threshold value and needs replacement. For example, upon determining that the cold plate 106 is too warm, controller 150 transmits a notification to the retailer interface 160 that informs the retail staff that the cold plate 106 is too warm. In other embodiments, controller 150 transmits a notification to the vendor server computer 180. For example, in a scenario where the controller 150 receives a measurement from a BIB sensor 105 configured to measure a syrup quantity in BIB 108 (e.g., a weight sensor or a point level sensor), and determines that the measurement surpasses a syrup quantity threshold for the BIB 108 (i.e., a weight measurement of the BIB 108 is lower than a weight threshold, or a height measurement of the syrup in the BIB 108 is lower than a height threshold), controller 150 is configured to transmit a notification to retailer interface 160 to notify retail staff that the BIB 108 needs replacement and/or transmit a notification to vendor server computer 180 to request a replacement BIB 108 for shipping to the retail business that hosts the beverage dispenser 102.

Another feature of system 100 is the ability to determine a quality of a beverage dispensed by beverage dispenser 102. In embodiments, a drain sensor 138 (e.g., a flow sensor, optical sensor, etc.) coupled to the waste outlet 104 for waste from the beverage dispenser 102 is capable of sensing at least one of a presence or an absence of fluid. The controller 150 receives from the drain sensor 138 an indication of at least one of the presence or absence of fluid. Furthermore, controller 150 is configured to determine that, if the sensed fluid exceeds a predetermined threshold (e.g., a time threshold or a volume threshold), the sensed fluid is a waste fluid, wherein the purpose of the predetermined threshold for the drain sensor 138 is to differentiate fluids that result from beverage overflow, melting ice, etc. from fluids that result from a user discarding a beverage. For example, the predetermined threshold may be set to a value for detecting a volume of liquid at the drain sensor 138 greater than a liquid volume that would be generated by melting ice.

In embodiments, the controller 150 is communicatively coupled with an actuator sensor 115, wherein the actuator sensor 115 is configured to provide an indication of an actuation of the actuation mechanism 114 of the beverage dispenser 102. In embodiments, the controller 150 is configured to receive an indication of an actuation of the actuation mechanism 114. In embodiments, the controller 150 is configured to determine which beverage among a number of beverages was selected by the user for dispensing based on the received indication of actuation of the actuation mechanism 114. In embodiments, controller 150 is configured to determine a time or times associated with the actuation of the actuation mechanism 114.

In embodiments, the controller 150 is configured to determine at least one of a duration of a stream of waste through the waste outlet 104 or a quantity of stream of waste through the outlet.

In embodiments, the controller 150 is configured to calculate a volume associated with the stream of waste through the outlet based up on the duration of the stream of waste through the outlet or the quantity of the stream of waste through the waste outlet 104.

In embodiments, the controller 150 is configured to determine a time or times associated with the stream of waste through the waste outlet 104.

In embodiments, the controller 150 is configured to correlate a dump of a beverage dispense from the beverage dispenser to the actuation of the at least one actuation mechanism when the calculated volume associated with the stream of waste through the waste outlet 104 is greater than a predetermined volume threshold indicative of the dump of the beverage and when a difference in time between the time or times associated with the stream of waste through the waste outlet 104 and the time or times associated with the actuation of the actuation mechanism 114 is less than a predetermined time threshold.

In embodiments, the controller 150 is configured to initiate an indication of the dump of the beverage and its correlation to the actuation of the at least one actuation mechanism.

In some embodiments, the system 100 can be an interactive system 100 for determining a quality of a dispensed beverage and initiating automated communications with an operator of the system 100 regarding the correlation of the actuation of the actuation mechanism 114 to a dump of the beverage dispensed from the beverage dispenser 102. For example, a sensor, such as a flow sensor (e.g., the drain sensor 138) coupled to the waste outlet 104, senses the presence and/or the absence of waste associated with dispensing of a beverage from the beverage dispenser 102 (e.g., as previously described) and provides an indication to the controller 150 communicatively coupled with the drain sensor 138. The controller 150 is configured to receive the indication from the drain sensor 138 and, when the controller 150 has also received an indication of an actuation of the actuation mechanism 114 of the beverage dispenser 102, correlates a dump of the beverage dispensed from the beverage dispenser 102 to the actuation of the actuation mechanism 114.

It should be noted that determining a dump of a beverage by correlating an indication of waste at a drain sensor 138 to actuation of an actuation mechanism 114 is provided by way of example and is not meant to limit the present disclosure. In other examples, the determination of a beverage dump can be made using other sensors, components, methodologies, and so forth. For example, a camera sensor can be used (e.g., in association with visual recognition software) to determine that a beverage has been dumped. In another example, an optical sensor can be used to determine that a dispensed beverage is clear and thus lacks one or more ingredients that would otherwise give the beverage an opaque appearance. The controller 150 then correlates the appearance of the beverage with a beverage dump. In some embodiments, this correlation is made even when less than a full volume of the beverage has been dumped, e.g., in a case where an operator notices the off-color of the beverage and dumps the beverage only a short time after initiating the pour.

In some embodiments, the system 100 requests the user via user interface 116 for feedback. In this embodiment, responsive to detecting a discarded drink, system 100 displays on user interface 116 one or more questions regarding the quality of the beverage and/or a reason for discarding the beverage. For example, a user dispenses a first beverage and dumps the beverage within a predetermined amount of time. Responsive to detecting the dumped beverage, system 100 displays a message on user interface 116 stating, "Hey . . . we noticed you poured out your drink, was there something wrong?" If the user indicates "yes," then system 100 displays a list of choices (e.g., problem with syrup-to-water ratio, temperature, carbonation, water quality) for the user to select from. In further embodiments, if the user selects "syrup-to-water ratio" as being the problem, system 100 displays a list of selections regarding whether the beverage was too weak (i.e., low syrup concentration) or too strong (i.e., high syrup concentration).

In embodiments, responsive to system 100 receiving a user feedback from the user regarding a problem with the discarded beverage, system 100 displays a message on retailer interface 160 to inform retail staff of the problem. In further embodiment, system 100 displays possible solutions for correcting the reported problem.

In general, system 100 may be used with a beverage dispenser 102 that serves any kind of beverage. For example, the beverage may include, but is not limited to, carbonated beverages, non-carbonated beverages, cold beverages, and hot beverages (e.g., hot tea or hot coffee). In embodiments, for a beverage dispenser 102 configured to dispense hot coffee, (hot coffee tends to become increasingly bitter with time) system 100 is configured to detect hot fluids pouring down the drain. In other words, a temperature sensor and a drain sensor are coupled to the outlet 104 to detect and fluids and temperature of the fluids being dumped. Responsive to determining that a hot fluid is dumped, system 100 determines that the coffee beverage is old and now bitter, and subsequently displays a message on retailer interface 160 that a new container of hot coffee should be brewed.

In the present examples, the system 100 also includes user interface 116 for communicating with an operator of the beverage dispenser 102. Once the controller 150 has correlated a dump of the beverage dispensed from the beverage dispenser 102 to the actuation of the actuation mechanism 114, the controller 150 is operatively configured to initiate one or more interactive engagements with an operator of the system 100 regarding the correlation of the actuation of the actuation mechanism 114 to the dump of the beverage dispensed from the beverage dispenser 102. In this manner, the systems, techniques, and apparatus of the present disclosure can be used with unattended beverage dispenser systems 100. In some examples, a beverage dispenser 102 can facilitate a retrofittable credit card-activated beverage dispenser system.

Figure 9:
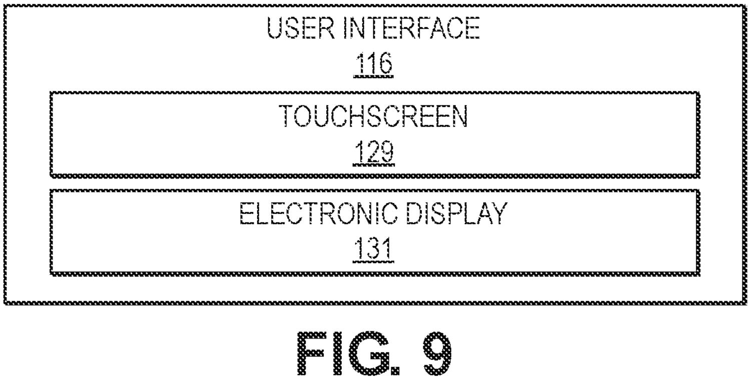
FIG. 9 is a block diagram illustrating one or more components of a user interface for a beverage dispenser, such as the beverage dispenser of FIG. 1, in accordance with example embodiments of the present disclosure.

As described, a credit card-based system 100 can include a cup sensor or another sensor that senses placement of a drink cup, which can be used to initiate a credit card session (e.g., via credit card session management). The system 100 can also include an attachable credit card and/or phone identifier system. The system 100 further includes the user interface 116. In reference to FIG. 9, some embodiments of the user interface 116 can be implemented as a touchscreen interface 129, e.g., on a self-serve drink dispensing tower or another type of self-serve dispenser. However, a touchscreen interface 129 is provided by way of example and is not meant to limit the present disclosure. In other embodiments, the user interface 116 can include one or more displays, keypads, touch panels, audio input/output devices, and so forth. For example, in some embodiments, the user interface 116 is implemented using an electronic display 131 (e.g., not having a touch interface). The controller 150 can be configured to accept instructions and provide notifications via the user interface 116 in a variety of formats. In some embodiments, the system 100 facilitates chargebacks to operators (e.g., customers). For the purposes of the present disclosure, the term "chargeback" shall be understood to refer to one or more actions taken to reverse an electronic payment, e.g., when a beverage has been dumped or otherwise deemed unacceptable.

As described, the interactive system 100 can be used to allow consumers to fabricate their own drinks without staff engagement. For example, restaurant or other service industry staff may be busy taking and preparing food or other orders, and it is thus desirable from an employee management standpoint for the taking and preparation of orders to remain the focus of the staff. Additionally, when staff shortages are experienced throughout a workforce, reducing peripheral work may become critical. The ability to not only engage a beverage dispenser 102 at the consumer level, but also to manage a credit card transaction without staff engagement is beneficial to both the consumer and to the staff, and, ultimately, to retailers themselves. As described, the systems, techniques, and apparatus of the present disclosure can manage an operator or consumer interactive experience with a beverage dispenser 102 when the operator or consumer (e.g., credit card customer) is unsatisfied with beverage quality.

In an example, a consumer has begun a session with a form of electronic payment (e.g., a credit card on file) by the time the consumer realizes the beverage is unacceptable. As described herein, the consumer's reaction of discarding the beverage is identified. The interactive system 100 engages the consumer directly, e.g., through a touchscreen on a self-serve drink dispensing tower. By understanding trends, the system 100 can identify a likely problem. For example, via the user interface 116, the system 100 can engage the user with a statement such as, "I noticed you discarded your soda drink; it may be that this soda product is out of stock, but the other brands should work fine. Please choose another brand and we will restore your credit to a full drink!" In another example, the system 100 can engage the user with a statement such as, "We see that you discarded your soda drink; it may be that the $CO_2$ supply is depleted. Please choose a non-carbonated brand and we will restore your credit to a full drink!"

In some embodiments, the controller 150 can be configured to adjust an operator's ability to select one or more beverages or beverage brands based upon the managed experience between a consumer and the user interface 116. For example, one or more beverages that are not being properly dispensed can be made no longer selectable via the user interface 116 (e.g., greyed out on a touchscreen). In some embodiments, when a consumer does not dispense another beverage within an allotted time after a dump of a beverage, the system 100 can initiate a refund to the customer and/or provide the customer with instructions on how to obtain a refund. In some embodiments, a system 100 is configured to instruct and/or inspire an operator to pour out a beverage when the quality of the beverage is poor. For example, via the user interface 116, the system 100 can engage an operator with one or more instructions, such as "Pour when poor!" In this manner, consumer needs can be intercepted before engagement with staff is initiated.

In some embodiments, the system 100 can provide an indication to staff that further communication from the facility where a beverage dispenser 102 is deployed to the maintainer and/or supplier is appropriate, e.g., to resolve a problem indicated by beverage dumping. For example, if the system 100 determines, based upon automated user interaction, that a particular soda brand is depleted, the staff may communicate to a maintainer and/or supplier that one or more components for a beverage dispenser 102 have been or will soon be replaced (e.g., for inventory maintenance purposes), may require restocking, and so forth. For instance, when a particular soda brand has been depleted, a system 100 may instruct staff to communicate to a supplier that a bag-in-box has been replaced. In some embodiments, a system 100 can include one or more backroom input devices to facilitate communication with the maintainer and/or supplier of components for a beverage dispenser 102. For instance, many resolutions of problems with a beverage dispenser 102 occur in the backroom/back of house (e.g., bag-in-box replacements, $CO_2$ source replacements, filter replacements, city water supply issues, and so forth). When an input device is provided in a backroom, an indicator and/or additional input device(s) may also be provided in the front of house. In some embodiments, the system 100 extrapolates usage of any ingredient supplies (e.g., BIB, $CO_2$, water filter, etc.) based on respective sensors that measure the ingredient supplies to forecast predictively when any one of the ingredient supplies need to be replaced and likewise transmit a replacement request to staff, maintainer, and/or supplier.

In some embodiments, a system 100 can include one or more self-serve drink dispensing towers all linked to the same beverage dispenser 102 (e.g., three dispensing towers that draw syrup from the same BIB(s)), and controller 150 makes determinations based on a culmination of sensors associated with each of the dispensing towers. For example, controller 150 determines that a BIB for a beverage type is depleted in response to controller 150 receiving an indication that a sip-and-dump is detected from two different dispensing towers and that the sip-and-dumps correlate to same beverage type.

In some embodiments, a system 100 can be used to identify problems with a beverage dispenser 102, such as a self-serve drink dispensing tower. For example, a system 100 may determine that a waste outlet 104, such as a drain, is clogged and possibly identify trash (e.g., straw sleeves) lodged in the drain. For example, a drain sensor 138 may indicate a continuous blockage in the drain. In another example, a system 100 can determine that a valve is stuck in an open or partially open orientation. For example, a drain sensor 138 may indicate a continuous flow from the beverage dispenser 102. In such instances, the staff of a facility may be notified by the system 100 to facilitate timely intervention.

In embodiments, a system 100 performs a modification of at least one actuation mechanism 114 of the beverage dispenser 102 correlated to a dump of a beverage dispensed from the beverage dispenser 102. In this embodiment, the modification of the at least one actuation mechanism 114 of the beverage dispenser 102 correlated to the dump of the beverage dispensed from the beverage dispenser 102 includes a removal of at least one option for dispensing a beverage from the beverage dispenser 102 based upon the association of the dump of the beverage with an attribute associated with the beverage. For example, in instances where controller 150 has associated the dump of a beverage with a detected syrup-to-water ratio of the beverage and/or the appearance of the beverage, the system 100 can modify the actuation mechanism 114 of the beverage dispenser by removing the option for dispensing said beverage. In other instances, the system 100 can modify the actuation mechanism 114 by removing the option for dispensing a beverage based on the identification of a predetermined number of dumps associated with said beverage, for example, within a predetermined period of time. The system 100 can thus prevent further dispense of a beverage product based on the determination of a problem related to said beverage, including that the associated BIB 108 is near-empty, insufficiency of one or more ingredients, that the beverage product is otherwise of poor quality, and so forth.

In implementations where the actuation mechanism 114 and actuator sensor 115 are implemented as a touch screen, the system 100 can modify the displayed graphical indicator(s) based on a dump of the dispensed beverage. For example, when the system 100 determines that an insufficient amount of an ingredient source, such as a cola beverage component, is available, the system 100 can modify the actuation mechanism 114 by removing the graphical indicator (e.g., selectable icon) associated with the cola beverage from the touchscreen interface.

It should be noted that a system 100 can be used to provide notifications to a maintainer and/or supplier of one or more components of a beverage dispenser 102. For example, the system 100 can communicate wirelessly (e.g., using Bluetooth, Wi-Fi, and/or another wireless communications protocol) with a beverage brand owner, a bottler, a third party, and so on. In an example, the system 100 can be communicatively coupled with one or more electronic devices (e.g., smart telephone devices) of a staff member, a facility owner, and so forth. Data from the system 100 can be automatically sent (e.g., via a cloud service) to a brand owner, a maintainer and/or supplier of beverage dispenser components, and so forth.

In examples where the system 100 sends data to a brand owner, the brand owner can use the data to track equipment sell outs, such as bag-in-box sell outs, understand local consumption patterns, and so forth. For instance, a particular brand may sell a higher volume of diet sodas in a certain geographic area than is typical for the brand, and restocking by the brand can be adjusted accordingly. Further, by understanding the consumption of carbonated beverages, a system 100 can predict when a $CO_2$ cartridge should be replaced. Such information can be used to automatically contact a $CO_2$ cartridge supplier and order replacement cartridges, e.g., before an out-of-stock condition occurs. In another example, water filters can also be replaced, reordered, and so forth. For example, information regarding the state of a water filter can be communicated to a retailer and/or used to order a replacement filter directly.

Figure 3:
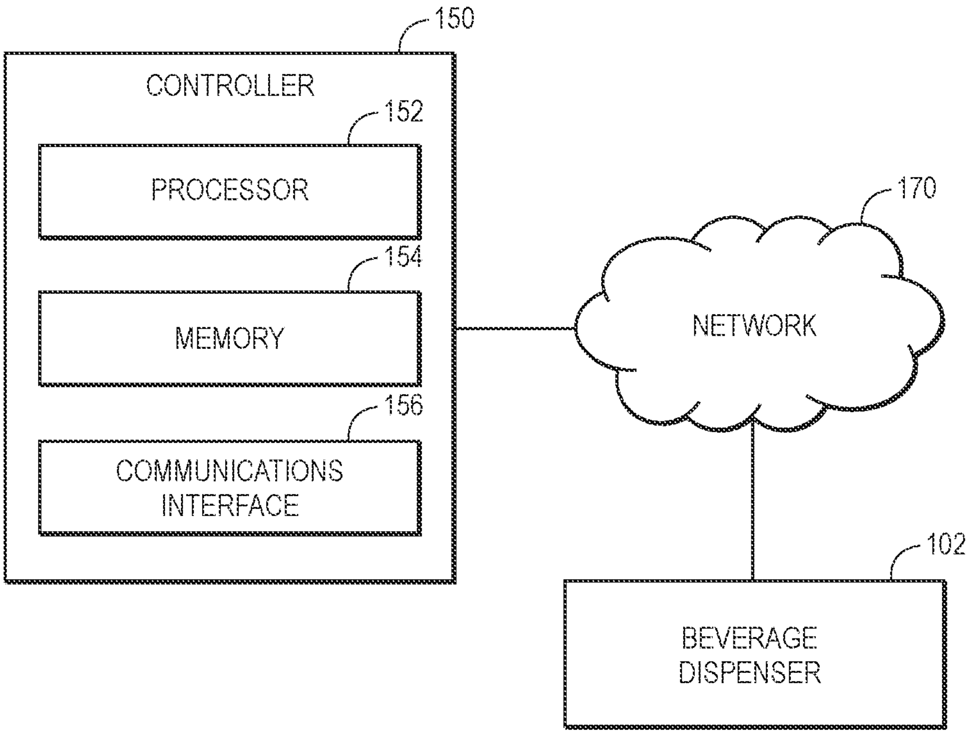
FIG. 3 is a block diagram illustrating a system, such as the system illustrated in FIG. 1, in accordance with example embodiments of the present disclosure.

Referring now to FIG. 3, a system 100, including some or all of its components, can operate under computer control. For example, a processor 152 can be included with or in a system 100 to control the components and functions of systems 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The controller 150 can include the processor 152, a memory 154, and a communications interface 156. The processor 152 provides processing functionality for the controller 150 and can include any number of processors, micro-controllers, or other processing systems, and resident or external memory for storing data and other information accessed or generated by the controller 150. The processor 152 can execute one or more software programs that implement techniques described herein. The processor 152 is not limited by the materials from which it is formed or the processing mechanisms employed therein and, as such, can be implemented via semiconductor(s) and/or transistors (e.g., using electronic integrated circuit (IC) components), and so forth.

The memory 154 is an example of tangible, computer-readable storage medium that provides storage functionality to store various data associated with operation of the controller 150, such as software programs and/or code segments, or other data to instruct the processor 152, and possibly other components of the controller 150, to perform the functionality described herein. Thus, the memory 154 can store data, such as a program of instructions for operating the system 100 (including its components), and so forth. It should be noted that while a single memory 154 is described, a wide variety of types and combinations of memory (e.g., tangible, non-transitory memory) can be employed. The memory 154 can be integral with the processor 152, can comprise stand-alone memory, or can be a combination of both.

The memory 154 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the system 100 and/or the memory 154 can include removable integrated circuit card (ICC) memory, such as memory provided by a subscriber identity module (SIM) card, a universal subscriber identity module (USIM) card, a universal integrated circuit card (UICC), and so on.

The communications interface 156 is operatively configured to communicate with components of the system 100. For example, the communications interface 156 can be configured to transmit data for storage in the system 100, retrieve data from storage in the system 100, and so forth. The communications interface 156 is also communicatively coupled with the processor 152 to facilitate data transfer between components of the system 100 and the processor 152 (e.g., for communicating inputs to the processor 152 received from a device communicatively coupled with the controller 150). It should be noted that while the communications interface 156 is described as a component of a controller 150, one or more components of the communications interface 156 can be implemented as external components communicatively coupled to the system 100 via a wired and/or wireless connection. The system 100 can also comprise and/or connect to one or more input/output (I/O) devices (e.g., via the communications interface 156), including, but not necessarily limited to: a display, a mouse, a touchpad, a keyboard, and so on.

The communications interface 156 and/or the processor 152 can be configured to communicate with a variety of different networks, including, but not necessarily limited to: a wide-area cellular telephone network, such as a 3G cellular network, a 4G cellular network, a 5G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 156 can be configured to communicate with a single network or multiple networks across different access points.

Figure 10A:
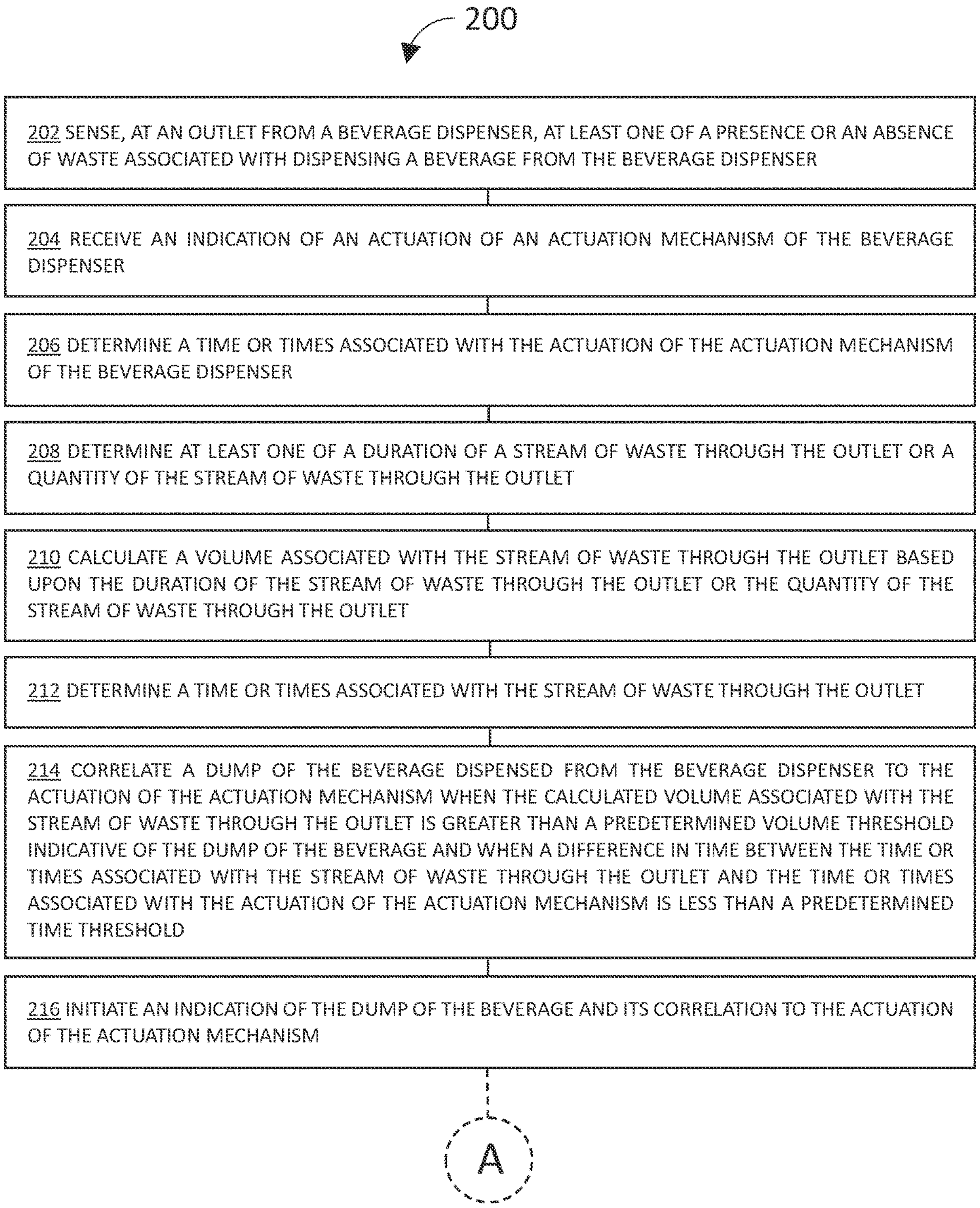
FIG. 10A is a flowchart depicting a first embodiment of operational steps for a beverage dispense system, such as the beverage dispense system of FIG. 1, in accordance with example embodiments of the present disclosure.
Figure 10B:
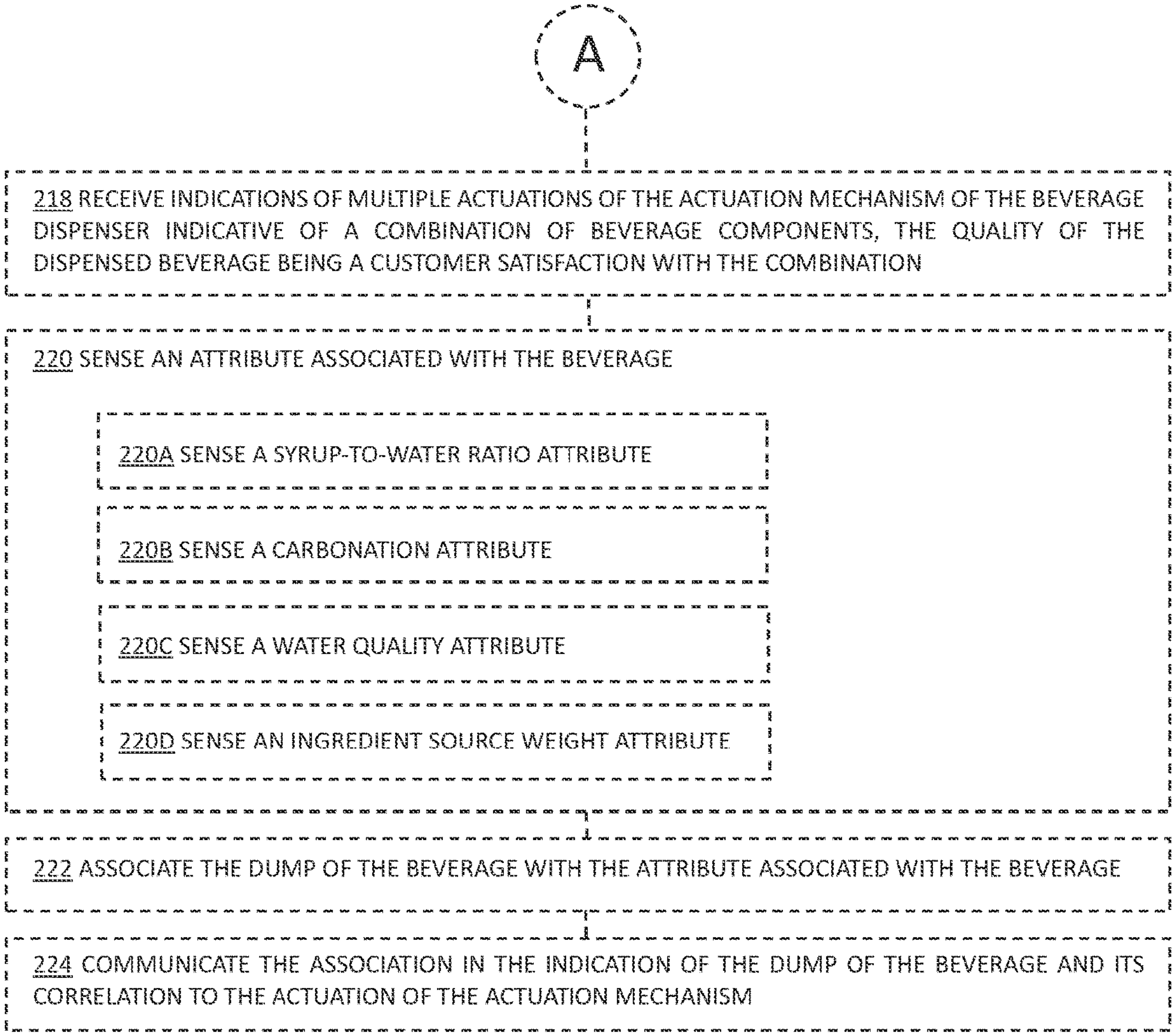
FIG. 10B is a flowchart depicting operational steps continuing from the flowchart of FIG. 10A.

Now referring to FIGS. 10A and 10B, flowchart 200 depicts operational steps for beverage dispense system 100 in accordance with an embodiment of the present invention.

In step 202, beverage dispense system 100 senses, at a waste outlet 104 from a beverage dispenser 102, at least one of a presence or an absence of waste associated with dispensing a beverage from the beverage dispenser 102.

In step 204, beverage dispense system 100 receives an indication of an actuation of an actuation mechanism 114 of the beverage dispenser 102.

In step 206, beverage dispense system 100 determines a time or times associated with the actuation of the actuation mechanism 114 of the beverage dispenser 102.

In step 208, beverage dispense system 100 determines at least one of a duration of a stream of waste through the waste outlet 104 or a quantity of the stream of waste through the waste outlet 104.

In step 210, beverage dispense system 100 calculates a volume associated with the stream of waste through the waste outlet 104 based upon the duration of the stream of waste through the waste outlet 104 or the quantity of the stream of waste through the waste outlet 104.

In step 212, beverage dispense system 100 determines a time or times associated with the stream of waste through the waste outlet 104.

In step 214, beverage dispense system 100 correlates a dump of the beverage dispensed from the beverage dispenser 102 to the actuation of the actuation mechanism 114 when the calculated volume associated with the stream of waste through the waste outlet 104 is greater than a predetermined volume threshold indicative of the dump of the beverage and when a difference in time between the time or times associated with the stream of waste through the waste outlet 104 and the time or times associated with the actuation of the actuation mechanism 114 is less than a predetermined time threshold.

In step 216, beverage dispense system 100 initiates an indication of the dump of the beverage and its correlation to the actuation of the actuation mechanism 114.

In some embodiments, such as that of step 218, beverage dispense system 100 receives indications of multiple actuation of actuation mechanism 114 of the beverage dispenser 102 indicative of a combination of beverage components, the quality of the dispensed beverage being a customer satisfaction with the combination.

In some embodiments, such as that of step 220, beverage dispense system 100 senses an attribute associated with the beverage. For example, in one embodiment, such as that of step 220A, beverage dispense system 100 senses a syrup-to-water ratio attribute. In another embodiment, such as that of step 220B, beverage dispense system 100 senses a carbonation attribute. In another embodiment, such as that of step 220C, beverage dispense system 100 senses a water quality attribute. In yet another embodiment, such as that of step 220D, beverage dispense system 100 senses an ingredient source weight attribute.

In some embodiments, such as that of step 222, beverage dispense system 100 associates the dump of the beverage with the attribute associated with the beverage In some embodiments, such as that of step 224, beverage dispense system 100 communicates the association in the indication of the dump of the beverage and its correlation of the actuation of the actuation mechanism.

Figure 11A:
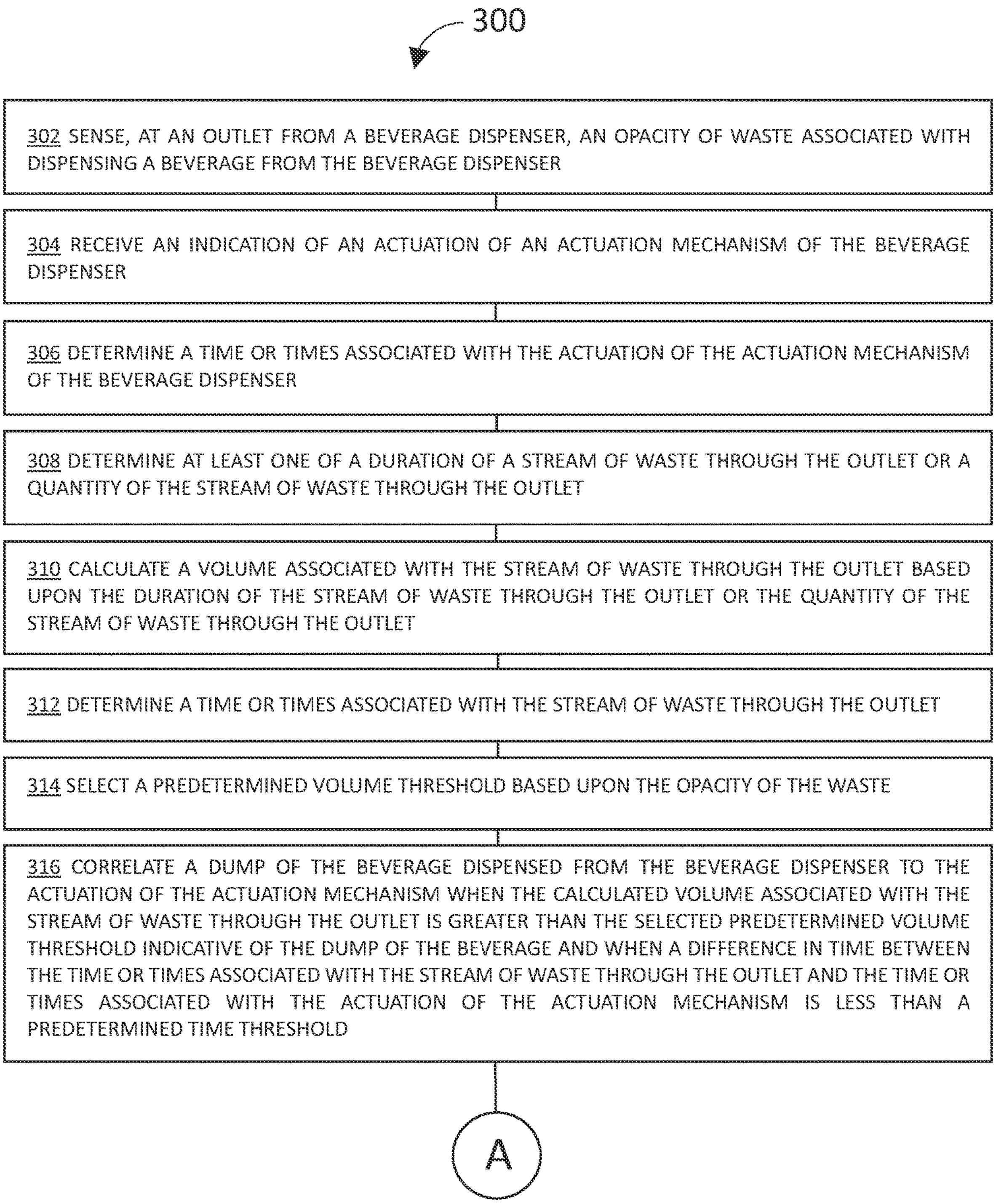
FIG. 11A is a flowchart depicting a second embodiment of operational steps for a beverage dispense system, such as the beverage dispense system of FIG. 1, in accordance with example embodiments of the present disclosure.
Figure 11B:
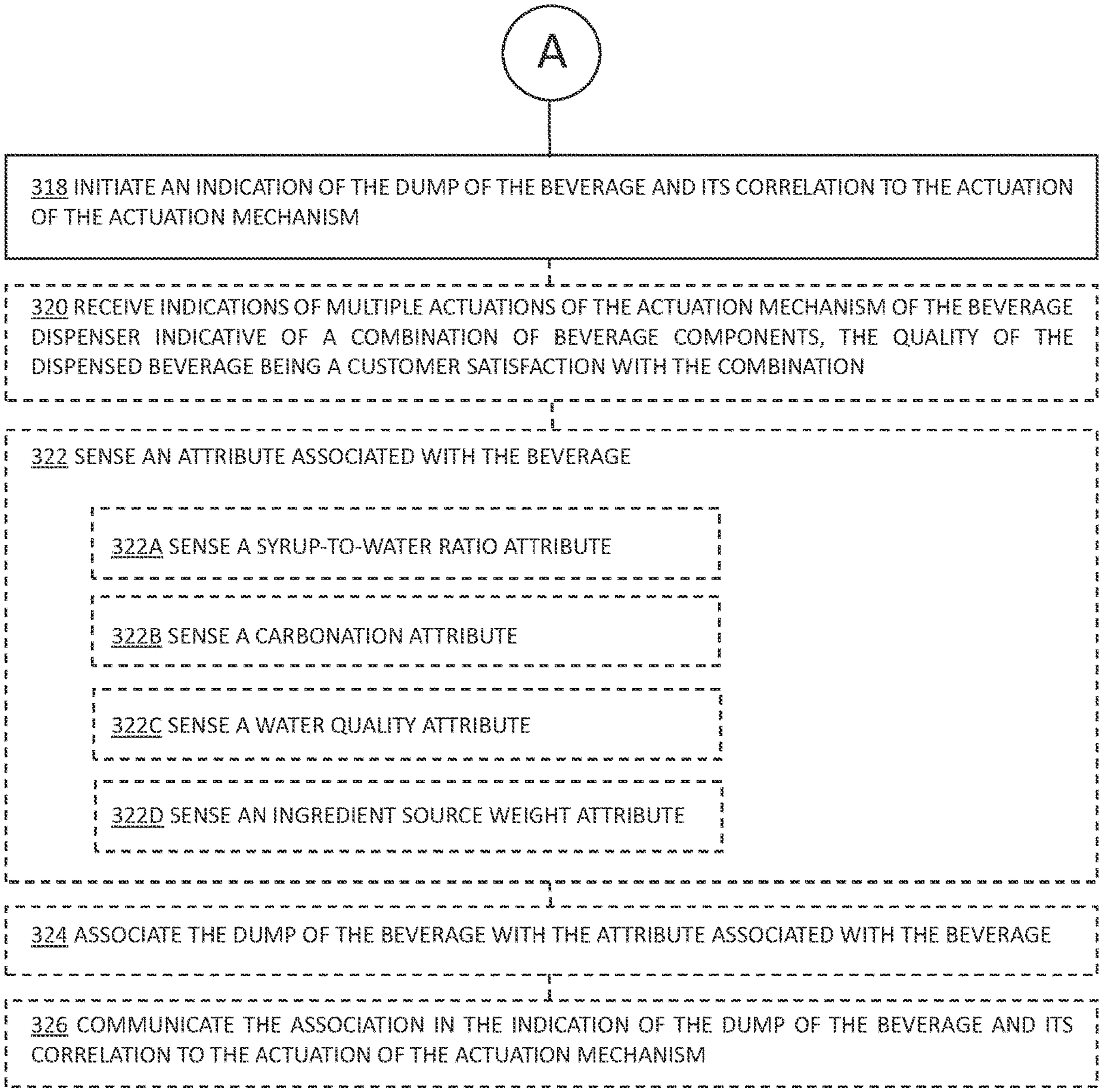
FIG. 11B is a flowchart depicting operational steps continuing from the flowchart of FIG. 11A.

Now referring to FIGS. 11A and 11B, flowchart 300 depicts operational steps for beverage dispense system 100 in accordance with an embodiment of the present invention.

In step 302, beverage dispense system 100 senses, at a waste outlet 104 from a beverage dispenser 102, an opacity of waste associated with dispensing a beverage from the beverage dispenser 102.

In step 304, beverage dispense system 100 receives an indication of an actuation of an actuation mechanism 114 of the beverage dispenser 102.

In step 306, beverage dispense system 100 determines a time or times associated with the actuation of the actuation mechanism 114 of the beverage dispenser 102.

In step 308, beverage dispense system 100 determines at least one of a duration of a stream of waste through the waste outlet 104 or a quantity of the stream of waste through the waste outlet 104.

In step 310, beverage dispense system 100 calculates a volume associated with the stream of waste through the waste outlet 104 based upon the duration of the stream of waste through the waste outlet 104 or the quantity of the stream of waste through the waste outlet 104.

In step 312, beverage dispense system 100 determines a time or times associated with the stream of waste through the waste outlet 104.

In step 314, beverage dispense system 100 selects a predetermined volume threshold based upon the opacity of the waste.

In step 316, beverage dispense system 100 correlates a dump of the beverage dispensed from the beverage dispenser 102 to the actuation of the actuation mechanism 114 when the calculated volume associated with the stream of waste through the waste outlet 104 is greater than a predetermined volume threshold indicative of the dump of the beverage and when a difference in time between the time or times associated with the stream of waste through the waste outlet 104 and the time or times associated with the actuation of the actuation mechanism 114 is less than a predetermined time threshold.

In step 318, beverage dispense system 100 initiates an indication of the dump of the beverage and its correlation to the actuation of the actuation mechanism 114.

In some embodiments, such as that of step 320, beverage dispense system 100 receives indications of multiple actuation of actuation mechanism 114 of the beverage dispenser 102 indicative of a combination of beverage components, the quality of the dispensed beverage being a customer satisfaction with the combination.

In some embodiments, such as that of step 322, beverage dispense system 100 senses an attribute associated with the beverage. For example, in one embodiment, such as that of step 322A, beverage dispense system 100 senses a syrup-to-water ratio attribute. In another embodiment, such as that of step 322B, beverage dispense system 100 senses a carbonation attribute. In another embodiment, such as that of step 322C, beverage dispense system 100 senses a water quality attribute. In yet another embodiment, such as that of step 322D, beverage dispense system 100 senses an ingredient source weight attribute.

In some embodiments, such as that of step 324, beverage dispense system 100 associates the dump of the beverage with the attribute associated with the beverage.

In some embodiments, such as that of step 326, beverage dispense system 100 communicates the association in the indication of the dump of the beverage and its correlation of the actuation of the actuation mechanism.

Figure 12A:
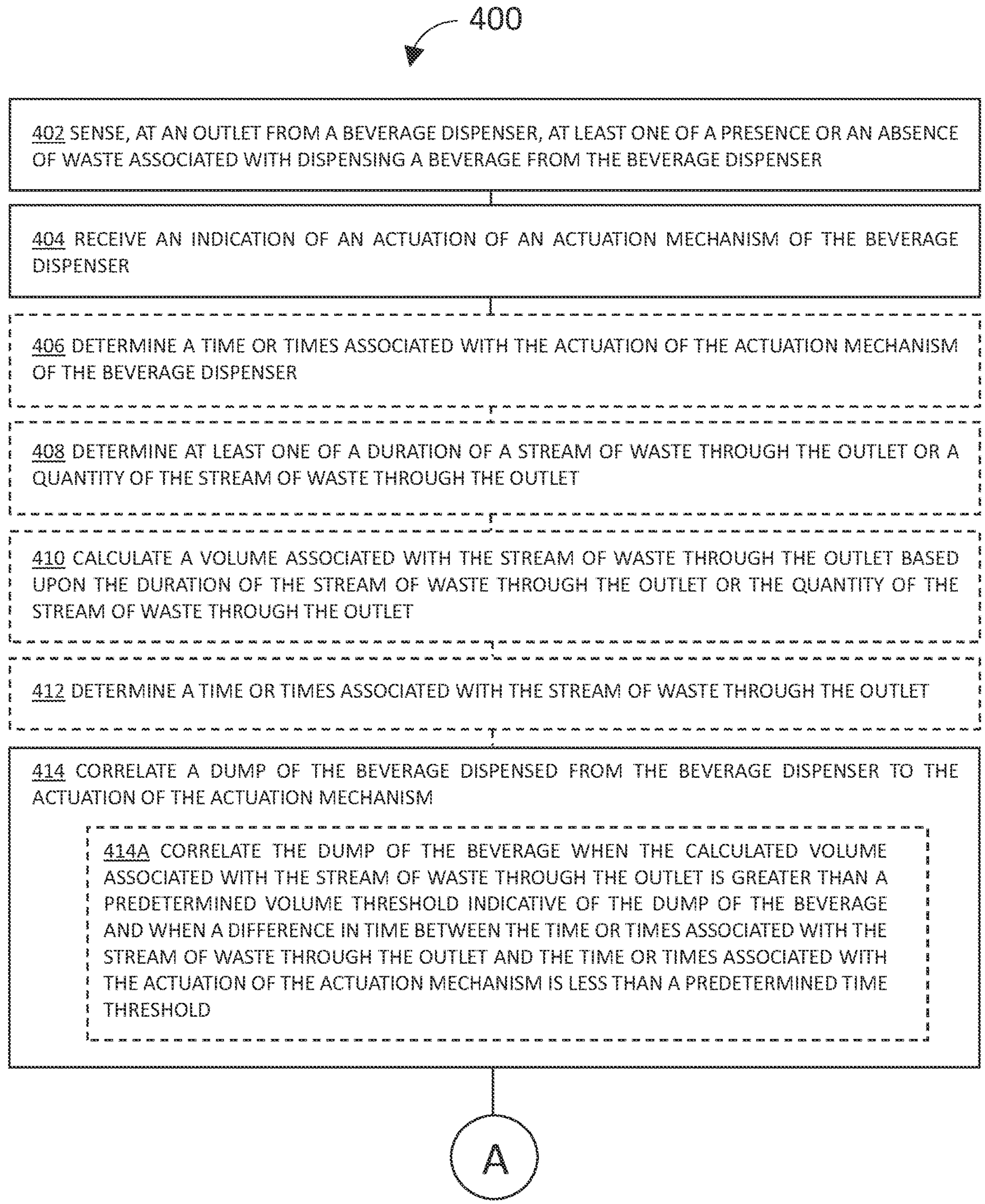
FIG. 12A is a flowchart depicting a third embodiment of operational steps for a beverage dispense system, such as the beverage dispense system of FIG. 1, in accordance with example embodiments of the present disclosure.
Figure 12B:
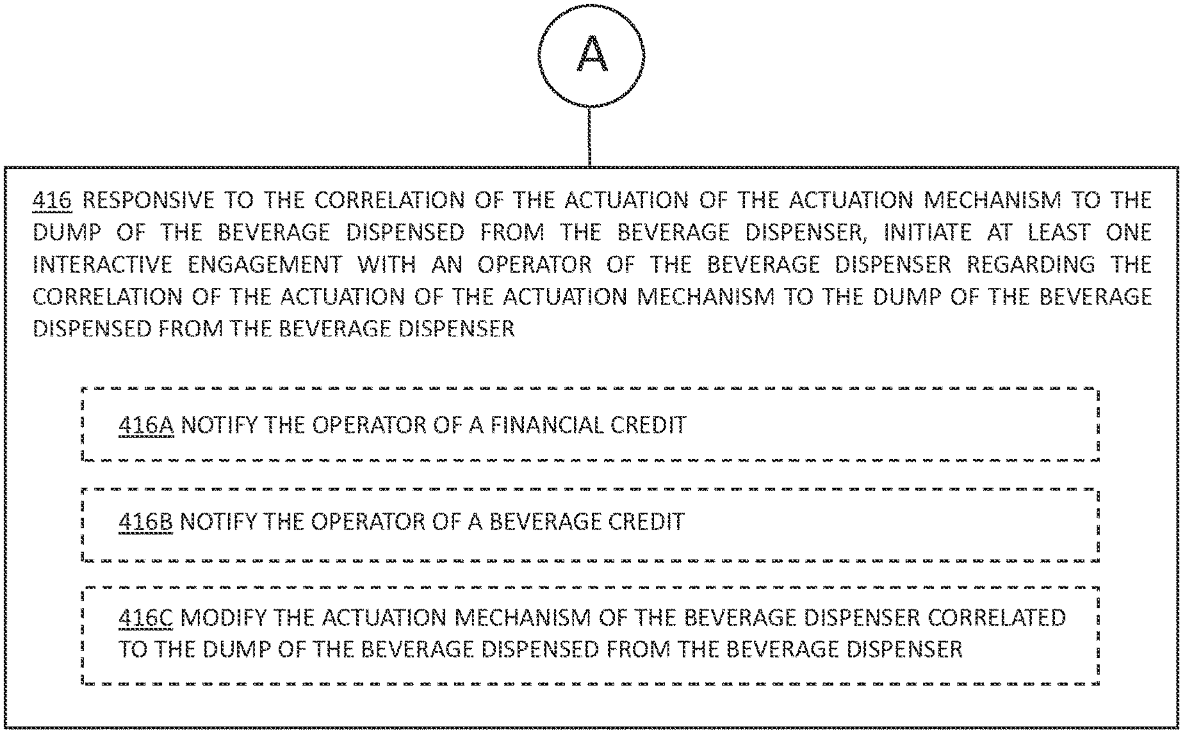
FIG. 12B is a flowchart depicting operational steps continuing from the flowchart of FIG. 12A.

Now referring to FIGS. 12A and 12B, flowchart 400 depicts operational steps for beverage dispense system 100 in accordance with an embodiment of the present invention.

In step 402, beverage dispense system 100 senses, at a waste outlet 104 from a beverage dispenser 102, at least one of a presence or an absence of waste associated with dispensing a beverage from the beverage dispenser 102.

In some embodiments, such as that of step 404, beverage dispense system 100 determines a time or times associated with the actuation of the actuation mechanism 114 of the beverage dispenser 102.

In some embodiments, such as that of step 406, beverage dispense system 100 determines a time or times associated with the actuation of the actuation mechanism 114 of the beverage dispenser 102.

In some embodiments, such as that of step 408, beverage dispense system 100 determines at least one of a duration of a stream of waste through the waste outlet 104 or a quantity of the stream of waste through the waste outlet 104.

In some embodiments, such as that of step 410, beverage dispense system 100 calculates a volume associated with the stream of waste through the waste outlet 104 based upon the duration of the stream of waste through the waste outlet 104 or the quantity of the stream of waste through the waste outlet 104.

In some embodiments, such as that of step 412, beverage dispense system 100 determines a time or times associated with the stream of waste through the waste outlet 104.

In step 414, beverage dispense system 100 correlates a dump of the beverage dispensed from the beverage dispenser 102 to the actuation of the actuation mechanism 114. In some embodiments, such as that of step 414A, beverage dispense system 100 correlates the dump of the beverage when the calculated volume associated with the stream of waste through the outlet is greater than a predetermined volume threshold indicative of the dump of the beverage when a difference in time between the time or times associated with the stream of waste through the outlet and the time or times associated with the actuation of the actuation mechanism is less than a predetermined time threshold.

In step 416, responsive to the correlation of the actuation of the actuation mechanism to the dump of the beverage dispensed from the beverage dispenser 102, beverage dispenser 102 initiates at least one interactive engagement with an operator of the beverage dispenser 102 regarding the correlation of the actuation of the actuation mechanism 114 to the dump of the beverage dispensed from the beverage dispenser 102. In one embodiment, such as that of 416A, beverage dispenser 102 notifies the operator of a financial credit. In another embodiment, such as that of 416B, beverage dispenser 102 notifies the operator of a beverage credit. In another embodiment, such as that of 416C, beverage dispenser 102 modifies the actuation mechanism 114 of the beverage dispenser correlated to the dump of the beverage dispensed from the beverage dispenser 102.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are intended to form a part of the invention as defined by the following claims, which are to be interpreted in the broadest sense allowable by law. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It is to be understood that the embodiments described herein can be implemented by various types of electromechanical systems having a wide range of electrical components including, but not necessarily limited to: hardware, software, firmware, and/or virtually any combination thereof. For example, an intelligent concentrate mixing and delivery device can include a computing device (e.g., a system controller) including a processor and a memory. The computing device/controller can be communicatively linked to the various sensors and the operative components of the intelligent concentrate mixing and delivery device, the beverage delivery device, and/or the beverage delivery system. In an embodiment, the intelligent concentrate mixing and delivery device expressly contemplates the use of an appropriate concordant sensor, even if not expressly otherwise mentioned, configured (e.g., positioned and communicatively coupled as necessary) to determine any of the various measured data points set forth herein (e.g., weight, pH, pressure, out-of-stock, etc.). The processor provides processing functionality for the computing device and may include any number of processors, micro-controllers, or other processing systems, and resident or external memory for storing data and other information accessed or generated by the computing device. The processor may execute one or more software programs that implement the techniques and modules described herein. The processor is not limited by the materials from which it is formed or the processing mechanisms employed therein and, as such, may be implemented via semiconductor(s) and/or transistors (e.g., electronic integrated circuits (ICs)), and so forth.

The memory is an example of device-readable storage media that provides storage functionality to store various data associated with the operation of the computing device, such as the software program and code segments mentioned above, or other data to instruct the processor and other elements of the computing device to perform the techniques described herein. Although a single memory is mentioned above, a wide variety of types and combinations of memory may be employed. The memory may be integral with the processor, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the computing device, the memory may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The computing device includes a display to display information to a user of the computing device. In embodiments, the display may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display may be backlit via a backlight such that it may be viewed in the dark or other low-light environments.

The display may be provided with a touch screen to receive input (e.g., data, commands, etc.) from a user. For example, a user may operate the computing device by touching the touch screen and/or by performing gestures on the touch screen. In some embodiments, the touch screen may be a capacitive touch screen, a resistive touch screen, an infrared touch screen, combinations thereof, and the like. The computing device may further include one or more input/output (I/O) devices (e.g., a keypad, buttons, a wireless input device, a thumbwheel input device, a trackstick input device, and so on). The I/O devices may include one or more audio I/O devices, such as a microphone, speakers, and so on.

The computing device may also include a communication module representative of communication functionality to permit computing device to send/receive data between different devices (e.g., components/peripherals) and/or over one or more networks. Communication module may be representative of a variety of communication components and functionality including, but not necessarily limited to: a browser; a transmitter and/or receiver; data ports; software interfaces and drivers; networking interfaces; data processing components; and so forth.

The one or more networks are representative of a variety of different communication pathways and network connections which may be employed, individually or in combinations, to communicate among the components of the system. Thus, the one or more networks may be representative of communication pathways achieved using a single network or multiple networks. Further, the one or more networks are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth.

Examples of wireless networks include, but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing device is described as including a user interface, which is storable in memory and executable by the processor. The user interface is representative of functionality to control the display of information and data to the user of the computing device via the display. In some implementations, the display may not be integrated into the computing device and may instead be connected externally using universal serial bus (USB), Ethernet, serial connections, and so forth. The user interface may provide functionality to allow the user to interact with one or more applications of the computing device by providing inputs (e.g., beverage brands, flavor shots, quality parameters, etc.) via the touch screen and/or the I/O devices. For example, the user interface may cause an application programming interface (API) to be generated to expose functionality to a temperature control module to configure the application for display by the display or in combination with another display.

In implementations, the user interface may include a browser (e.g., for implementing functionality of the control modules described herein). The browser enables the computing device to display and interact with content such as a webpage within the World Wide Web, a webpage provided by a web server in a private network, and so forth. The browser may be configured in a variety of ways. For example, the browser may be configured as an amplification control module or detection control module accessed by the user interface. The browser may be a web browser suitable for use by a full resource device with substantial memory and processor resources (e.g., a smart phone, a personal digital assistant (PDA), etc.).

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the system, for example, can be wired, wireless, or some combination thereof. In the case of a software implementation, for instance, a module may represent executable instructions that perform specified tasks when executed on a processor, such as the processor described herein. The program code can be stored in one or more device-readable storage media, an example of which is the memory associated with the computing device.

It is to be understood that embodiments of the present invention described above are intended to be merely exemplary. Those skilled in the art will recognize, or be able to ascertain using no more than routine experimentation, numerous equivalents to the specific procedures described herein. All such equivalents are considered to be within the scope of the present invention and are covered by the following claims.

It is further contemplated that any embodiment or implementation of the disclosure manifested above as a system or method may include at least a portion of any other embodiment or implementation described herein. Those having skill in the art will appreciate that there are various embodiments or implementations by which systems and methods described herein can be implemented, and that the implementation will vary with the context in which an embodiment of the disclosure is deployed.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system for determining a quality of a dispensed beverage, the system comprising:

- a sensor for coupling with an outlet for waste from a beverage dispenser, the sensor capable of sensing at least one of a presence or an absence of waste associated with dispensing a beverage from the beverage dispenser; and
- a controller communicatively coupled with the sensor for receiving an indication of the at least one of the presence or the absence of waste associated with the dispensing of the beverage, the controller configured to be communicatively coupled with at least one actuation mechanism of the beverage dispenser, the controller operatively configured to:
  - receive an indication of an actuation of the at least one actuation mechanism of the beverage dispenser,
  - determine a time or times associated with the actuation of the at least one actuation mechanism of the beverage dispenser,
  - determine at least one of a duration of a stream of waste through the outlet or a quantity of the stream of waste through the outlet,
  - calculate a volume associated with the stream of waste through the outlet based upon the duration of the stream of waste through the outlet or the quantity of the stream of waste through the outlet,
  - determine a time or times associated with the stream of waste through the outlet,
  - correlate a dump of the beverage dispensed from the beverage dispenser to the actuation of the at least one actuation mechanism when the calculated volume associated with the stream of waste through the outlet is greater than a predetermined volume threshold indicative of the dump of the beverage and when a difference in time between the time or times associated with the stream of waste through the outlet and the time or times associated with the actuation of the at least one actuation mechanism is less than a predetermined time threshold, and
  - initiate an indication of the dump of the beverage and its correlation to the actuation of the at least one actuation mechanism.

2. The system as recited in claim 1, wherein the controller is communicatively coupled with the at least one actuation mechanism to receive a plurality of indications of multiple actuations of the at least one actuation mechanism of the beverage dispenser indicative of a combination of beverage components, and the quality of the dispensed beverage comprises a customer satisfaction with the combination.

3. The system as recited in claim 1, further comprising a second sensor for sensing an attribute associated with the beverage, the controller communicatively coupled with the second sensor and operatively configured to associate the dump of the beverage with the attribute associated with the beverage and communicate the association in the indication of the dump of the beverage and its correlation to the actuation of the at least one actuation mechanism.

4. The system as recited in claim 3, wherein the second sensor comprises at least one of a temperature sensor for sensing a temperature attribute associated with the beverage, a syrup sensor for facilitating detection of a syrup-to-water ratio attribute associated with the beverage, a carbonation sensor for sensing a carbonation attribute associated with the beverage, a water quality sensor for sensing a water quality attribute associated with the beverage, or a weight sensor for sensing an ingredient source weight attribute associated with the beverage.

5. The system as recited in claim 3, wherein the second sensor is a water quality sensor for sensing a water quality attribute associated with the beverage, the water quality sensor comprising at least one of an optical sensor, a rotary vane sensor, a capacitive sensor, a life sensor, or a bypass sensor.

6. The system as recited in claim 3, wherein the second sensor is a bag-in-box sensor for sensing an ingredient source attribute associated with the beverage, the bag-in-box sensor comprising at least one of a weight sensor or a vibration sensor.

7. The system as recited in claim 1, wherein the sensor for sensing the at least one of the presence or the absence of waste associated with dispensing the beverage from the beverage dispenser comprises at least one of an optical sensor, a rotary vane sensor, or a capacitive sensor.

8. An interactive system for determining a quality of a dispensed beverage, the interactive system comprising:

a sensor capable of sensing at least one of a presence or an absence of waste associated with dispensing a beverage from a beverage dispenser;

a user interface for communicating with an operator of the beverage dispenser; and a controller communicatively coupled with the sensor for receiving an indication of the at least one of the presence or the absence of the waste associated with the dispensing of the beverage from the beverage dispenser, the controller operatively configured to:

receive an indication of an actuation of at least one actuation mechanism of the beverage dispenser, receive an indication of the at least one of the presence or the absence of the waste associated with the dispensing of the beverage from the beverage dispenser, correlate a dump of the beverage dispensed from the beverage dispenser to the actuation of the at least one actuation mechanism, and initiate, via the user interface, at least one interactive engagement with the operator of the beverage dispenser regarding the correlation of the actuation of the at least one actuation mechanism to the dump of the beverage dispensed from the beverage dispenser.

9. The interactive system as recited in claim 8, wherein the interactive engagement comprises a notification to the operator of at least one of a financial credit or a beverage credit.

10. The interactive system as recited in claim 8, wherein the interactive engagement comprises a modification of the at least one actuation mechanism of the beverage dispenser correlated to the dump of the beverage dispensed from the beverage dispenser.

11. The interactive system as recited in claim 10, further comprising a second sensor for sensing an attribute associated with the beverage, the controller communicatively coupled with the second sensor and operatively configured to associate the dump of the beverage with the attribute associated with the beverage.

12. The interactive system as recited in claim 11, wherein the modification of the at least one actuation mechanism of the beverage dispenser correlated to the dump of the beverage dispensed from the beverage dispenser comprises a removal of at least one option for dispensing a beverage from the beverage dispenser based upon the association of the dump of the beverage with the attribute associated with the beverage.

13. The interactive system as recited in claim 8, wherein the user interface comprises at least one of a touchscreen interface or an electronic display.

14. A method for determining a quality of a dispensed beverage, the method comprising:

sensing, at an outlet from a beverage dispenser, an opacity of waste associated with dispensing a beverage from the beverage dispenser;

receiving an indication of an actuation of at least one actuation mechanism of the beverage dispenser;

determining a time or times associated with the actuation of the at least one actuation mechanism of the beverage dispenser;

determining at least one of a duration of a stream of waste through the outlet or a quantity of the stream of waste through the outlet;

calculating a volume associated with the stream of waste through the outlet based upon the duration of the stream of waste through the outlet or the quantity of the stream of waste through the outlet;

determining a time or times associated with the stream of waste through the outlet;

selecting a predetermined volume threshold based upon the opacity of the waste;

correlating a dump of the beverage dispensed from the beverage dispenser to the actuation of the at least one actuation mechanism when the calculated volume associated with the stream of waste through the outlet is greater than the selected predetermined volume threshold indicative of the dump of the beverage and when a difference in time between the time or times associated with the stream of waste through the outlet and the time or times associated with the actuation of the at least one actuation mechanism is less than a predetermined time threshold; and initiating an indication of the dump of the beverage and its correlation to the actuation of the at least one actuation mechanism.

15. The method as recited in claim 14, further comprising receiving a plurality of indications of multiple actuations of the at least one actuation mechanism of the beverage dispenser indicative of a combination of beverage components, wherein the quality of the dispensed beverage comprises a customer satisfaction with the combination.

16. The method as recited in claim 14, further comprising sensing an attribute associated with the beverage, associating the dump of the beverage with the attribute associated with the beverage, and communicating the association in the indication of the dump of the beverage and its correlation to the actuation of the at least one actuation mechanism.

17. The method as recited in claim 16, wherein the attribute comprises at least one of a temperature attribute associated with the beverage, a syrup-to-water ratio attribute associated with the beverage, a carbonation attribute associated with the beverage, a water quality attribute associated with the beverage, or an ingredient source weight attribute associated with the beverage.

18. The system as recited in claim 16, wherein sensing an attribute associated with the beverage is performed using at least one of an optical sensor, a rotary vane sensor, a capacitive sensor, a life sensor, or a bypass sensor.

19. The system as recited in claim 16, wherein sensing an attribute associated with the beverage is performed using at least one of a weight sensor or a vibration sensor.

20. The system as recited in claim 14, wherein sensing an opacity of waste associated with dispensing a beverage from the beverage dispenser is performed using an optical sensor.

* * * * *